May 1, 1962 D. W. WATSON 3,032,166
AUTOMATIC CODING APPARATUS FOR EMBOSSING MACHINES
Filed July 5, 1960 19 Sheets-Sheet 1
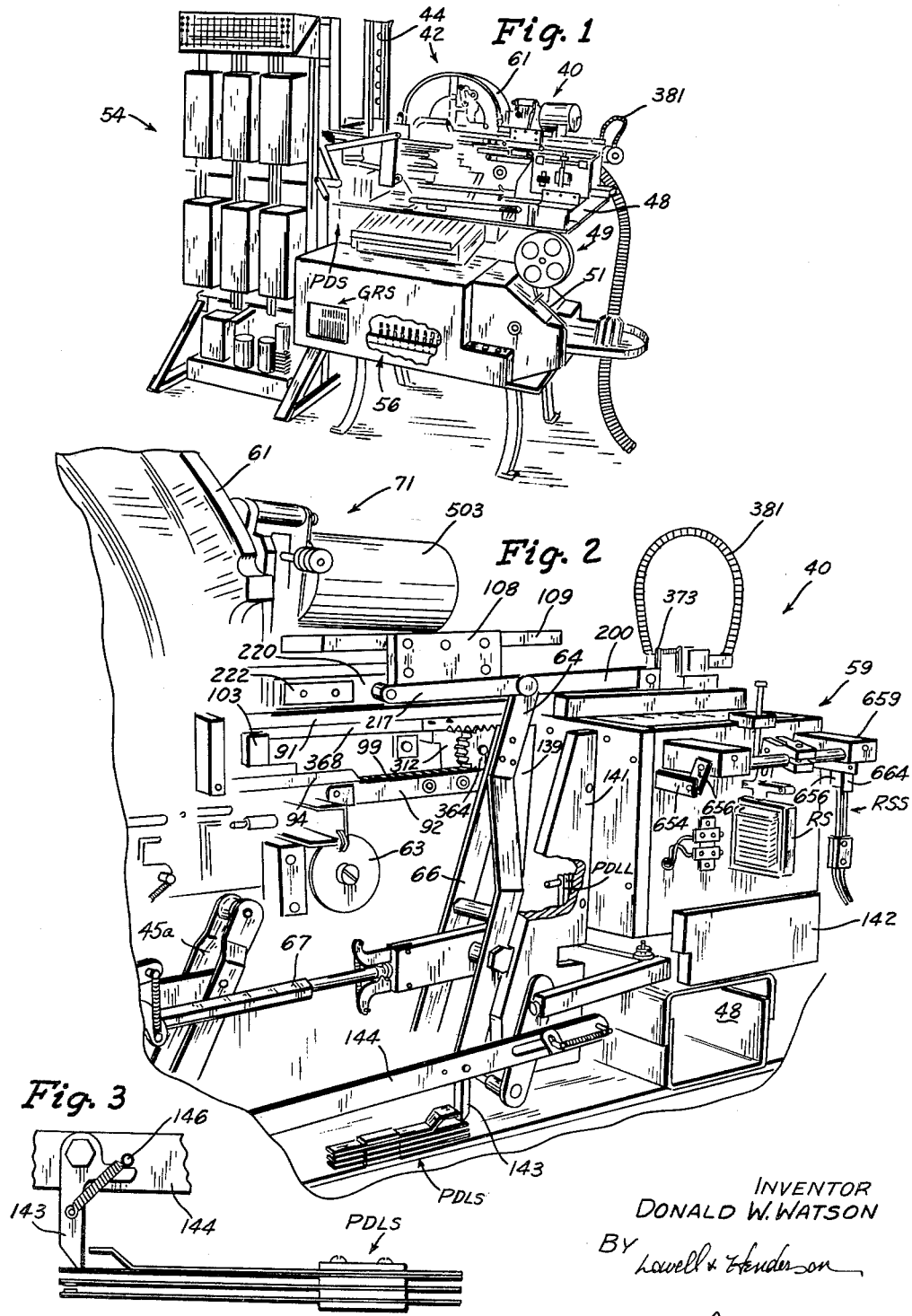
INVENTOR
DONALD W. WATSON
BY Lowell & Henderson
ATTORNEYS May 1, 1962 D. W. WATSON 3,032,166
AUTOMATIC CODING APPARATUS FOR EMBOSSING MACHINES
Filed July 5, 1960 19 Sheets-Sheet 2

INVENTOR
DONALD W. WATSON
BY
Lowell & Henderson
ATTORNEYS

May 1, 1962 D. W. WATSON 3,032,166
AUTOMATIC CODING APPARATUS FOR EMBOSSING MACHINES
Filed July 5, 1960 19 Sheets-Sheet 3

INVENTOR
DONALD W. WATSON
BY
Lowell & Henderson
ATTORNEYS

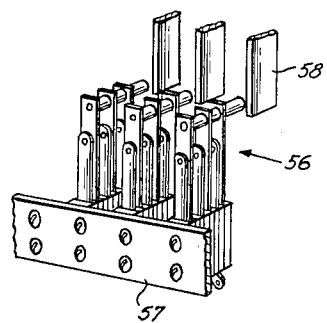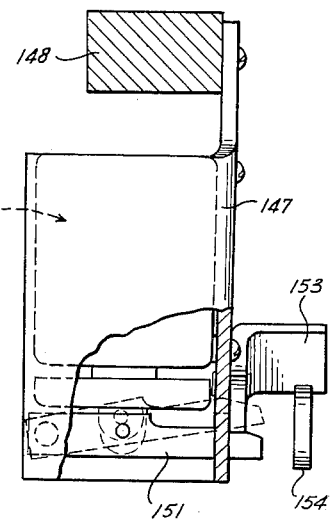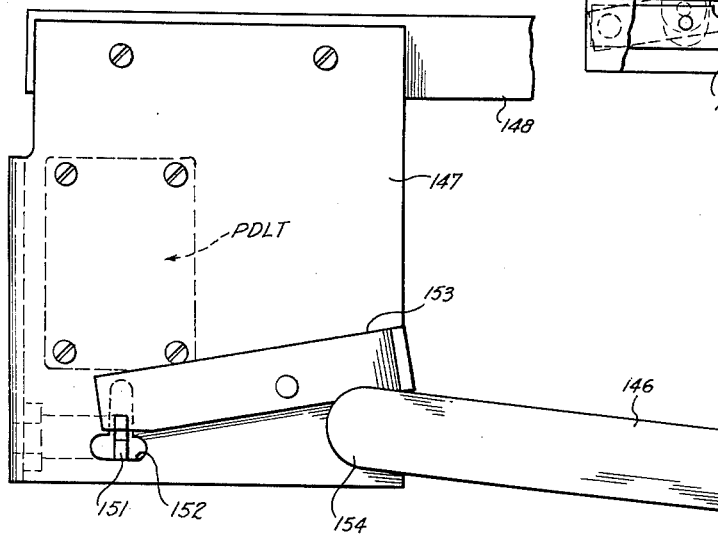

May 1, 1962 D. W. WATSON 3,032,166
AUTOMATIC CODING APPARATUS FOR EMBOSSING MACHINES
Filed July 5, 1960 19 Sheets-Sheet 5

INVENTOR
DONALD W. WATSON
BY
Lowell & Henderson
ATTORNEYS

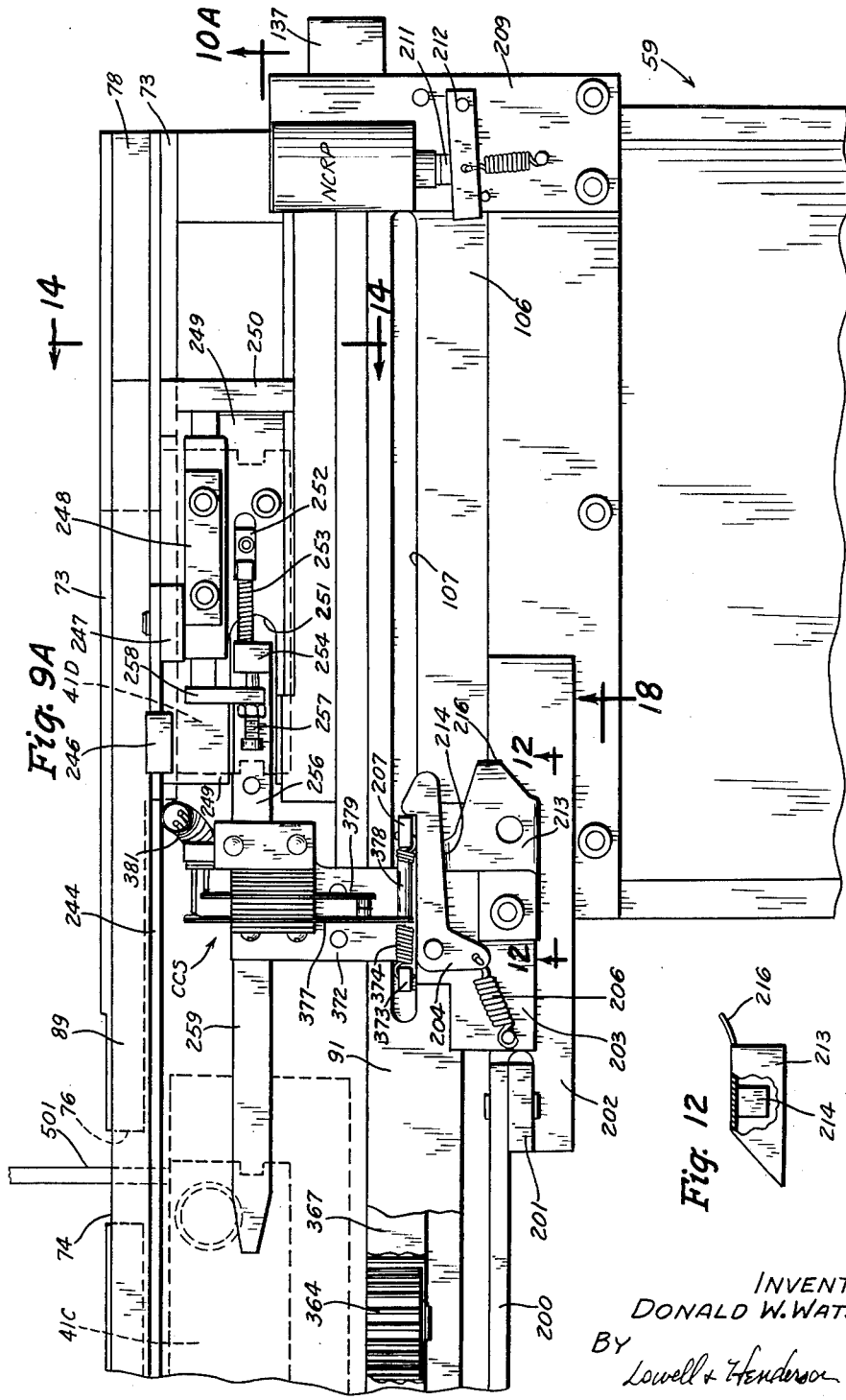

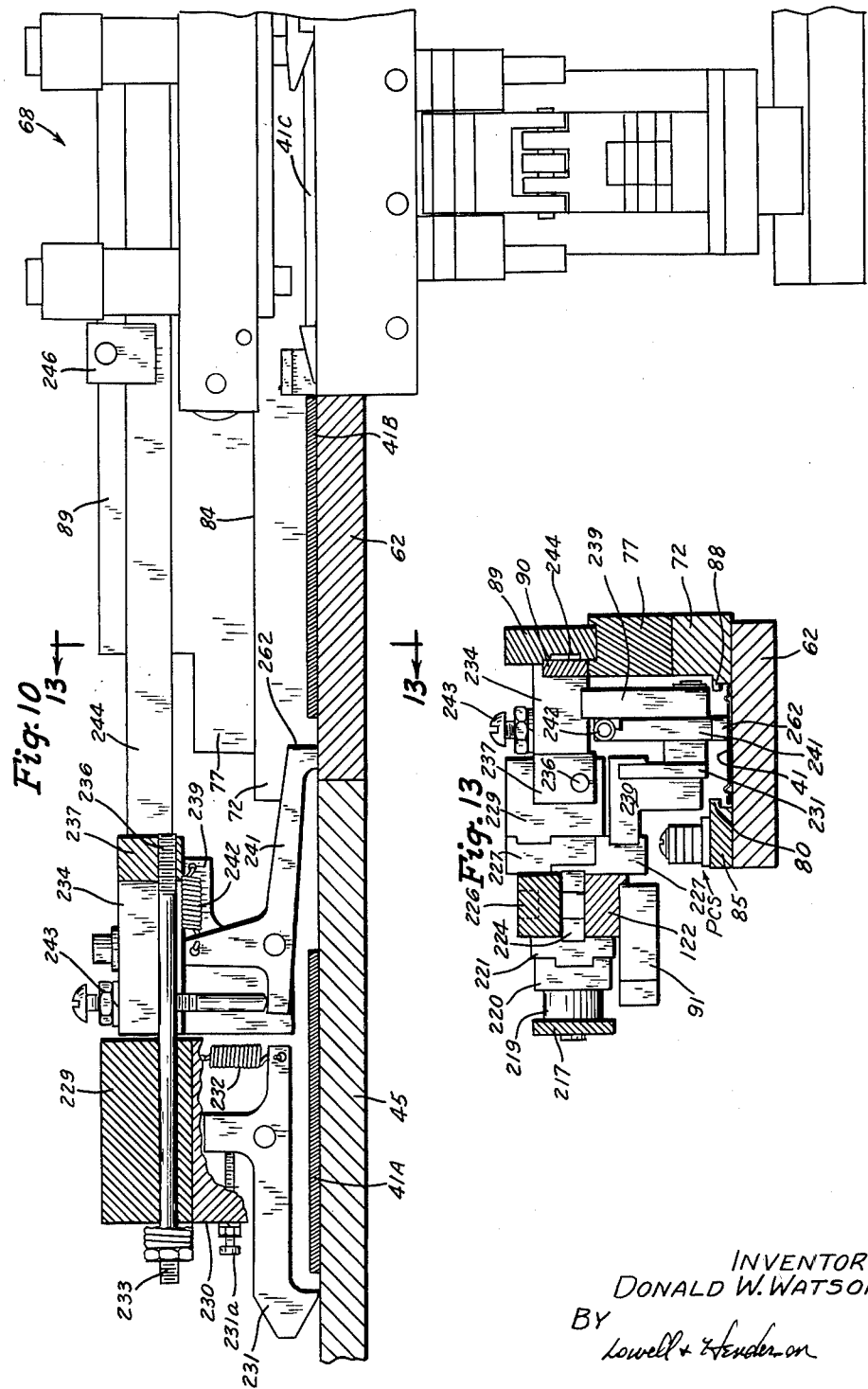

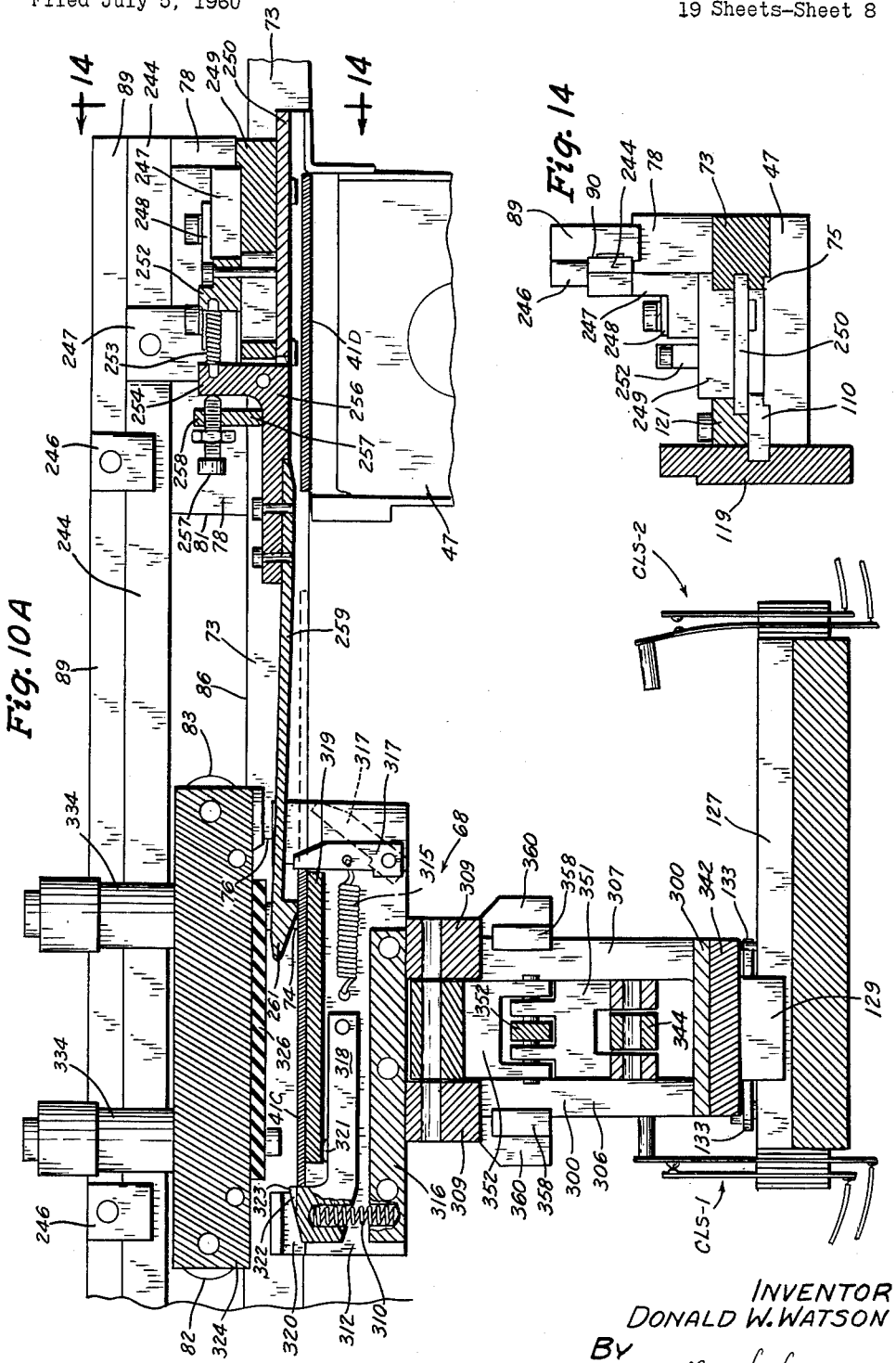

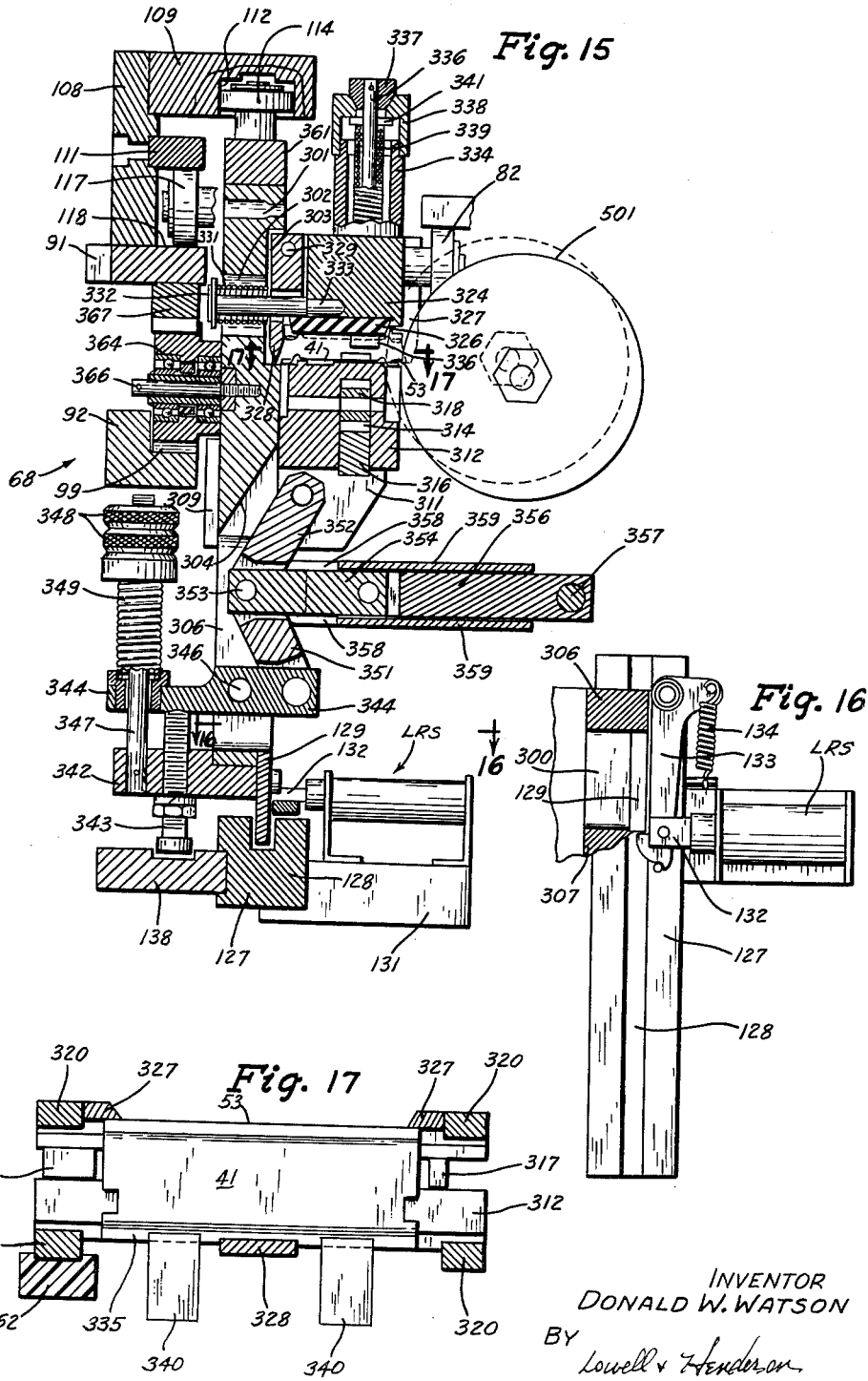

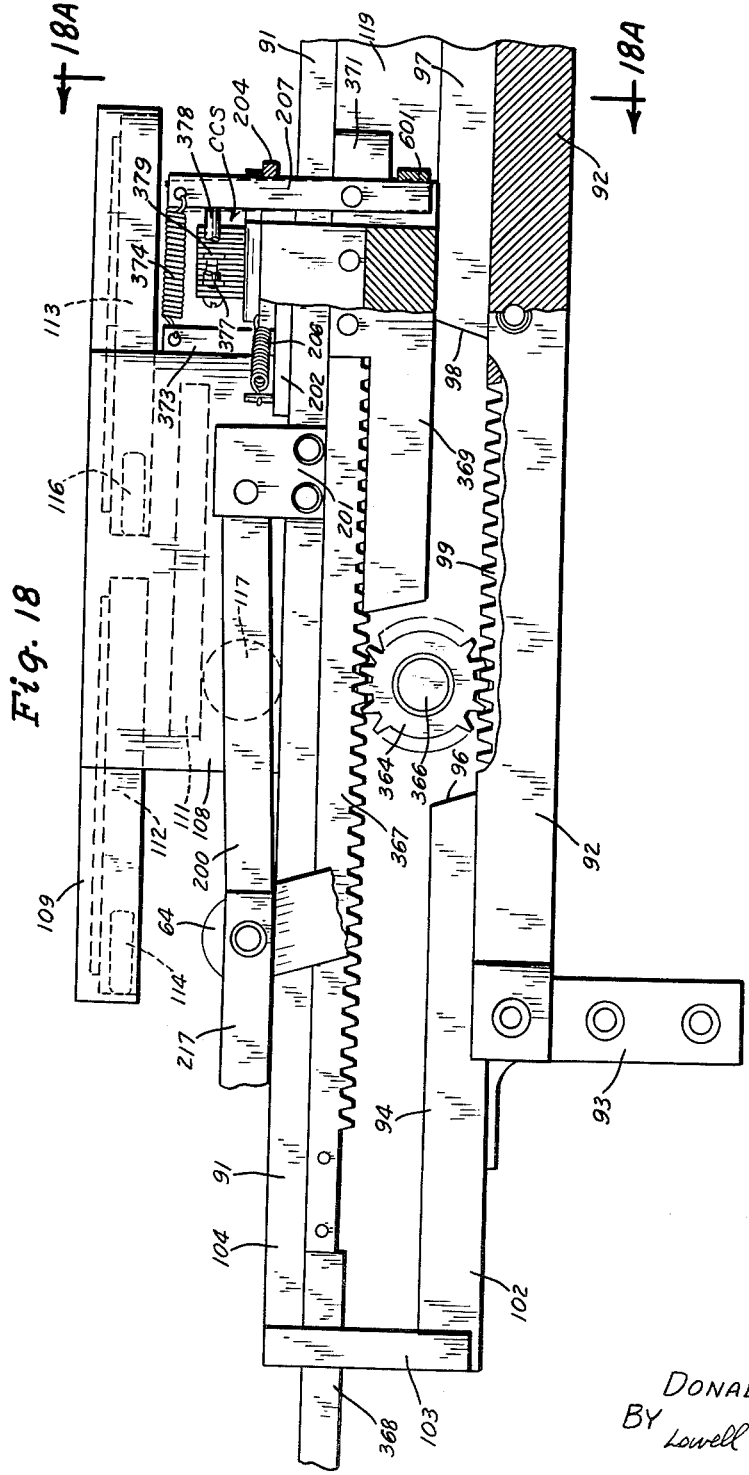

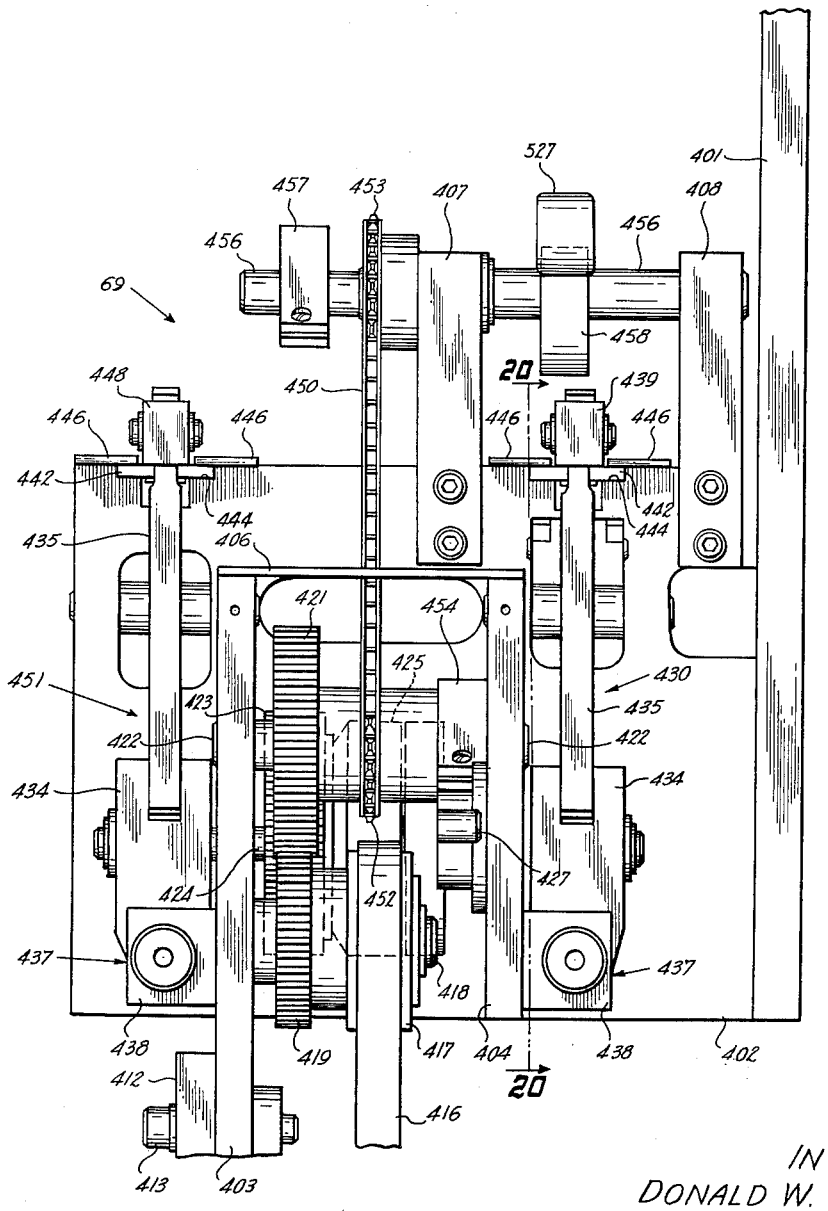

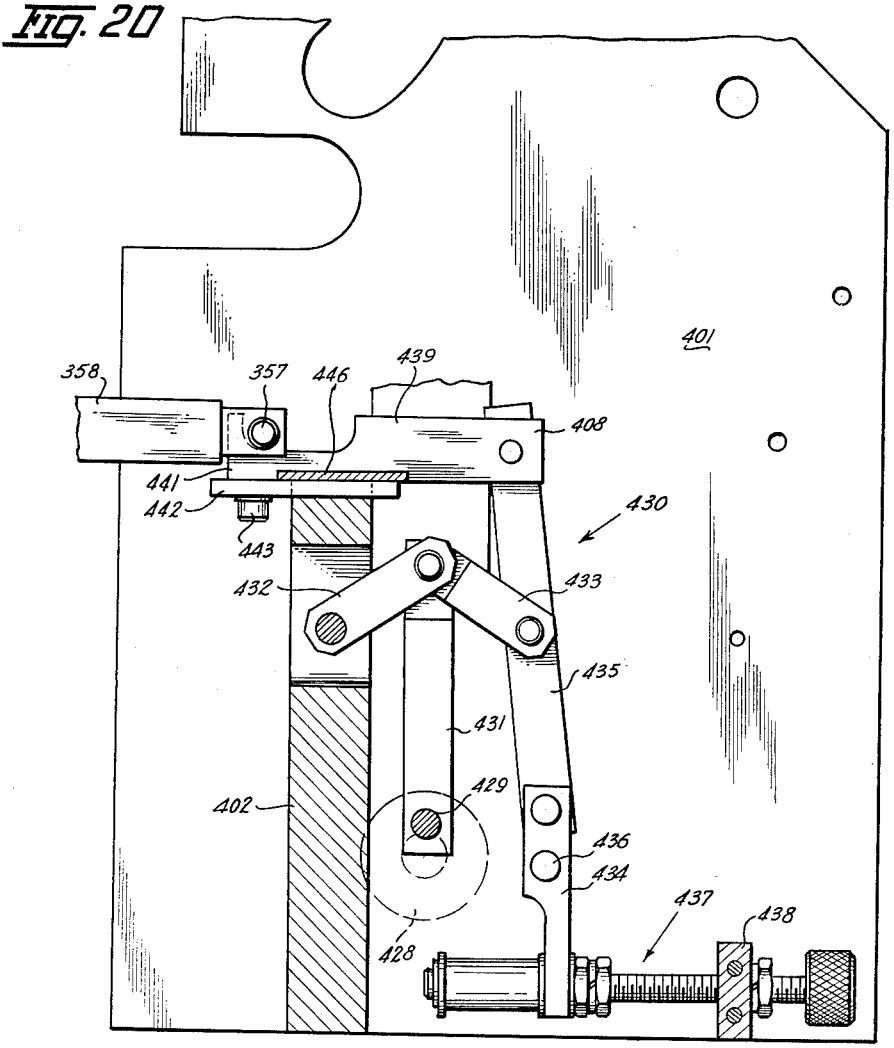

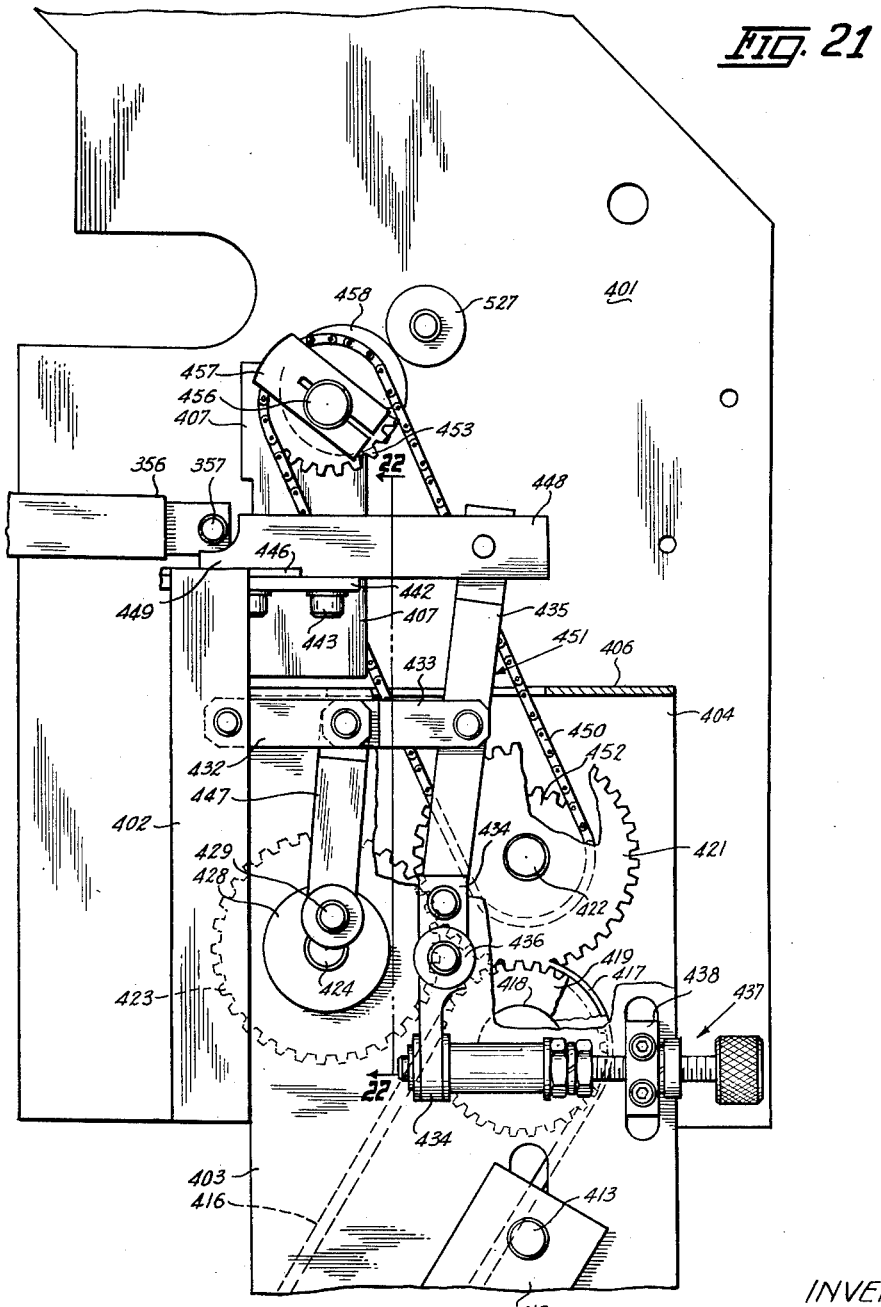

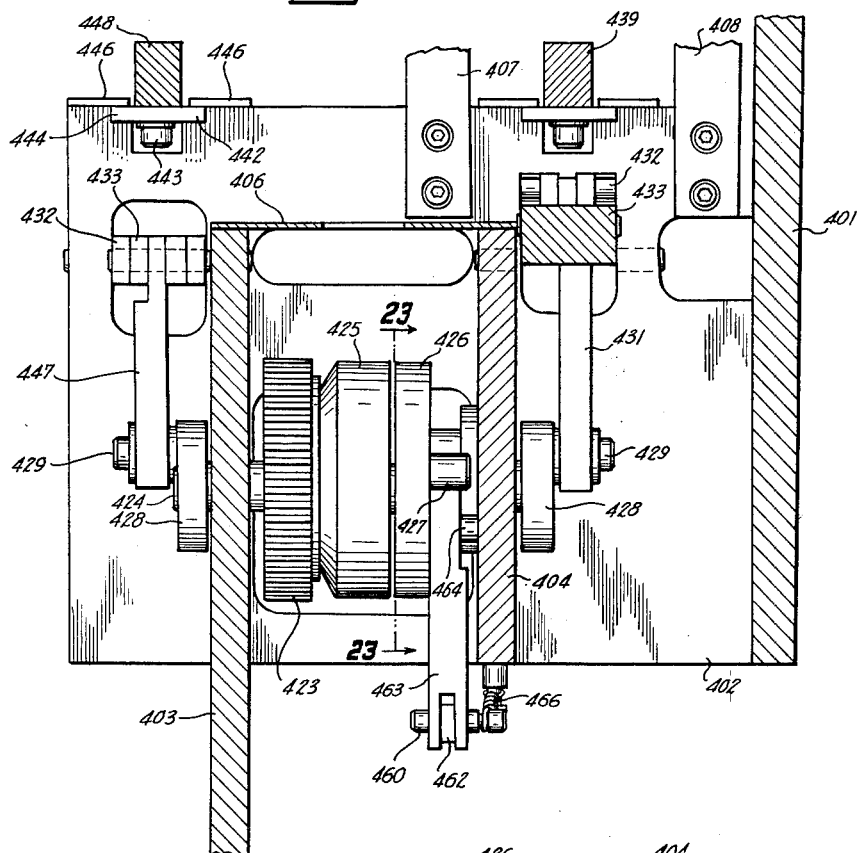
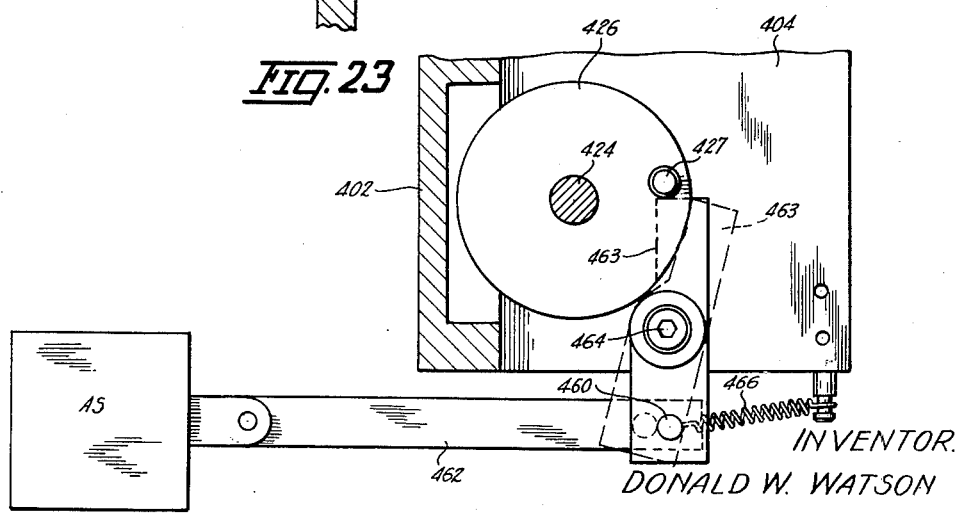
Fig. 22
Fig. 23
INVENTOR.
DONALD W. WATSON
BY Lowell & Henderson
ATTORNEYS.

May 1, 1962 D. W. WATSON 3,032,166
AUTOMATIC CODING APPARATUS FOR EMBOSSING MACHINES
Filed July 5, 1960 19 Sheets-Sheet 16

INVENTOR.
DONALD W. WATSON

BY Lowell & Henderson

ATTORNEYS.

May 1, 1962 D. W. WATSON 3,032,166
AUTOMATIC CODING APPARATUS FOR EMBOSSING MACHINES
Filed July 5, 1960 19 Sheets-Sheet 17
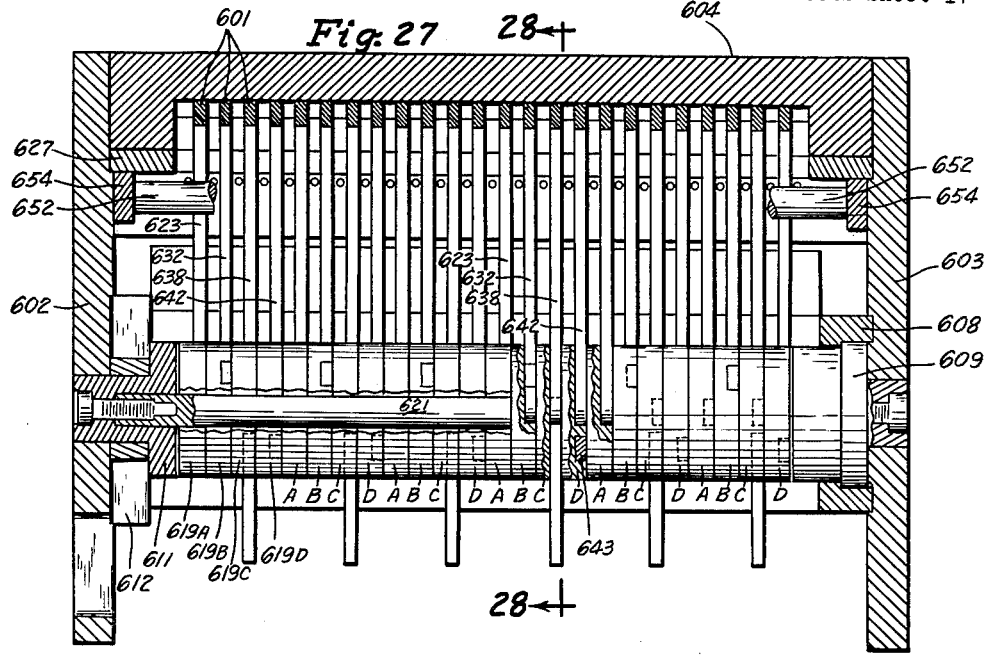
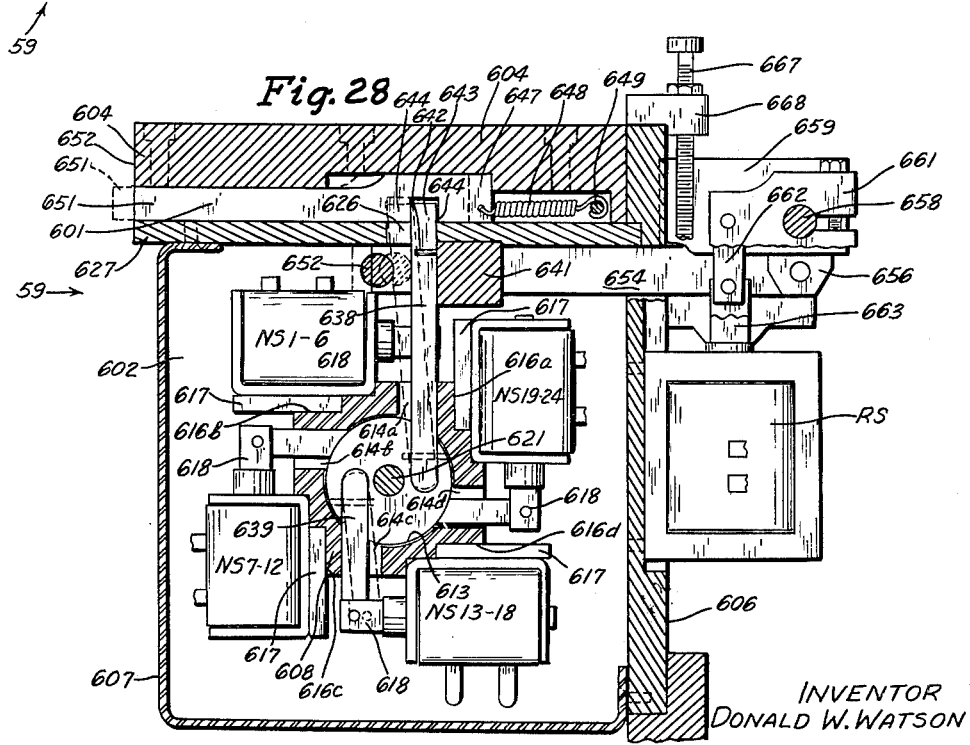
INVENTOR
DONALD W. WATSON
BY
Lowell & Henderson
ATTORNEYS

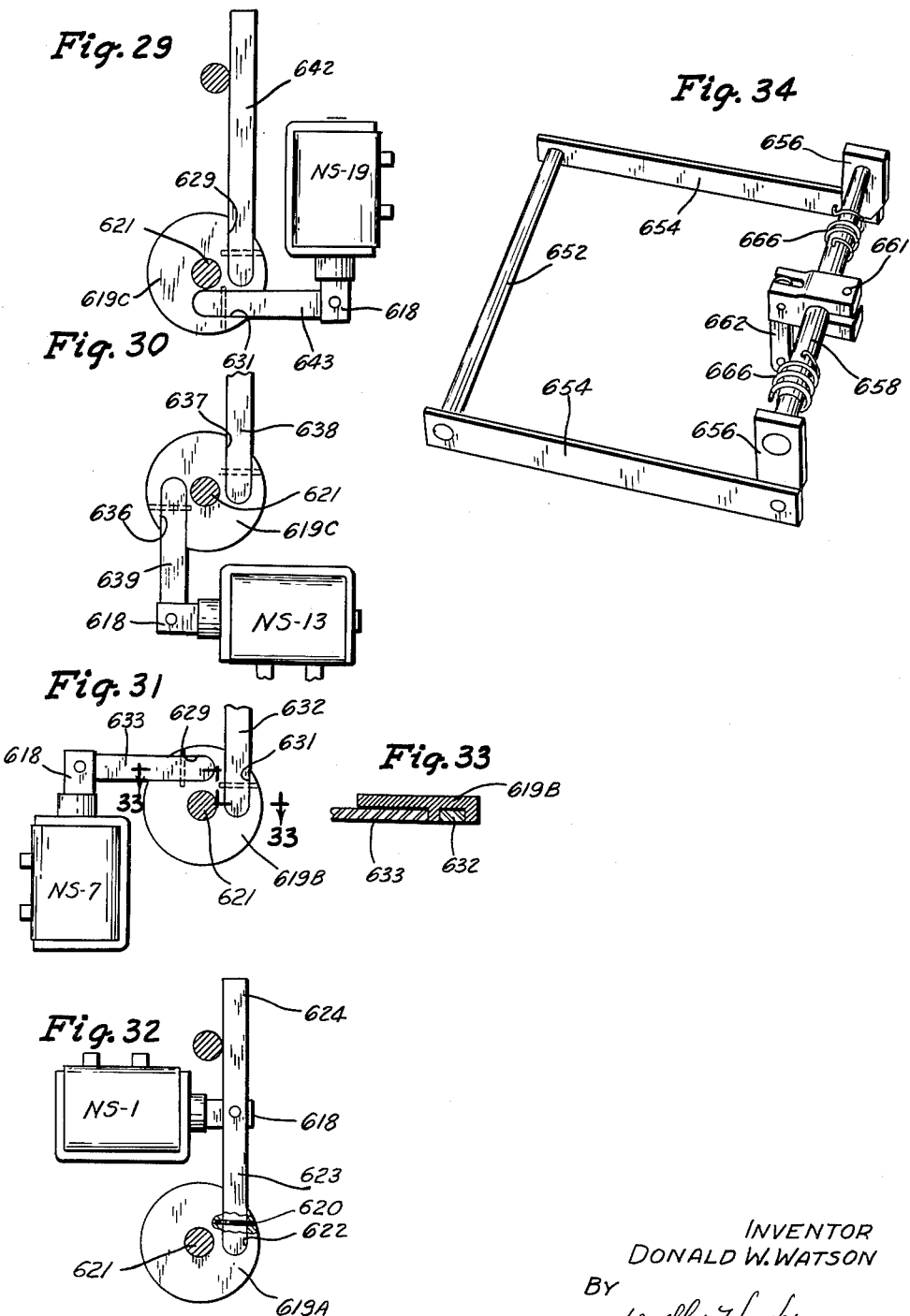

May 1, 1962

D. W. WATSON 3,032,166

AUTOMATIC CODING APPARATUS FOR EMBOSSING MACHINES

Filed July 5, 1960

INVENTOR
DONALD W. WATSON
BY
Lowell & Henderson
ATTORNEYS

United States Patent Office 3,032,166
Patented May 1, 1962

3,032,166
AUTOMATIC CODING APPARATUS FOR EMBOSSING MACHINES
Donald W. Watson, Des Moines, Iowa, assignor to Midwest Automatic Inc. of Iowa, Des Moines, Iowa, a corporation of Iowa
Filed July 5, 1960, Ser. No. 40,774
30 Claims. (Cl. 197—20)

This invention relates to embossing and information recording machines and more particularly to automatically controlled machines for recording the embossed information in the form of coded notches on embossed plates.

An object of this invention is to provide a novel apparatus that may be applied to a standard automatic plate embossing machine for cutting a combination of notches in each plate, which notches comprise a code for subsequent reading therefrom.

Another object of this invention is the provision of an automatic plate notching apparatus applied as aforementioned which is responsive to a control code on a tape from which characters are embossed on each of a series of plates, the apparatus adapted to apply the characters to each plate in the form of a coded combination of notches cut therein.

A further object of this invention is the provision of an automatic plate notching apparatus applied as aforementioned that is responsive to stored coded information read out electrically from a storage unit wherein the information was read in and stored simultaneously with the embossment thereof by separate means responsive to a control form on each of a series of plates, the reading out of the stored coded information controlling the apparatus to apply the same to each plate in the form of a coded combination of notches cut therein.

Another object of this invention is the provision of a novel apparatus for ready attachment to a machine without material alteration thereof, which machine is responsive to a control form for embossing characters in varying permutations on a plurality of plates, the apparatus comprising a unit for electrically storing the character information during the embossing stage, and subsequently thereto reading out the information to an electro-mechanical unit for applying the character information to the plates in a coded combination of notches cut therein.

Yet another object of this invention is the provision of an automatic notching apparatus applied as mentioned hereinbefore capable of transferring an embossed plate from the embossed plate stage to a receiving magazine stage, between which stages the plate is temporarily arrested, clamped and then moved in pre-selected sequentially stopped positions past an oscillatory cutting apparatus which selectively cuts notches in the plate in time-delayed response to electrically stored embossing information and which notches when properly sensed convey the identical information as that embossed, the plate then being unclamped and delivered to the receiving magazine.

It is an object of this invention to provide in an apparatus capable of attaining the above mentioned objectives a novel feeding of a plate from an embossing stage through a notching stage to a discharge stage.

Another object of this invention is to provide in an apparatus as mentioned hereinbefore a novel carriage device for transferring each plate through a notching stage, wherein the plate is accurately located in two directions and adjustably clamped according to the embossment thereon before notching, and effectively released from its clamped position after notching.

A further object of this invention is to provide in an apparatus as mentioned hereinbefore an improved actuating and notch cutting combined mechanism for conjoint use with the plate feeding and plate carriage mechanism whereby automatic control of the apparatus is accomplished easily and expeditiously.

Yet another object of this invention is the provision in an automatic notching apparatus applied as hereinbefore mentioned wherein a novel subcombination thereof embraces a number of electromagnetic units radially arranged to selectively move one of a plurality of selectable elements connected therewith for actuation purposes.

It is another object of this invention to provide an automatic notching apparatus applied as hereinbefore mentioned which is simple in construction, easily serviced, and effective in operation.

These objects and other features and advantages of this invention will become readily apparent to those skilled in the art upon consideration of the following description when taken in conjunction with the accompanying drawings, wherein:

FIG. 1 is a perspective view of an automatic plate embossing machine embodying the present invention;

FIG. 2 is an enlarged fragmentary perspective view of the machine from the left front;

FIG. 3 is an enlarged detail rear view of a plate discharge lever switch of the machine;

FIG. 7 is an enlarged fragmentary perspective view of several of the notching apparatus reader switches for the machine;

Figure 4:
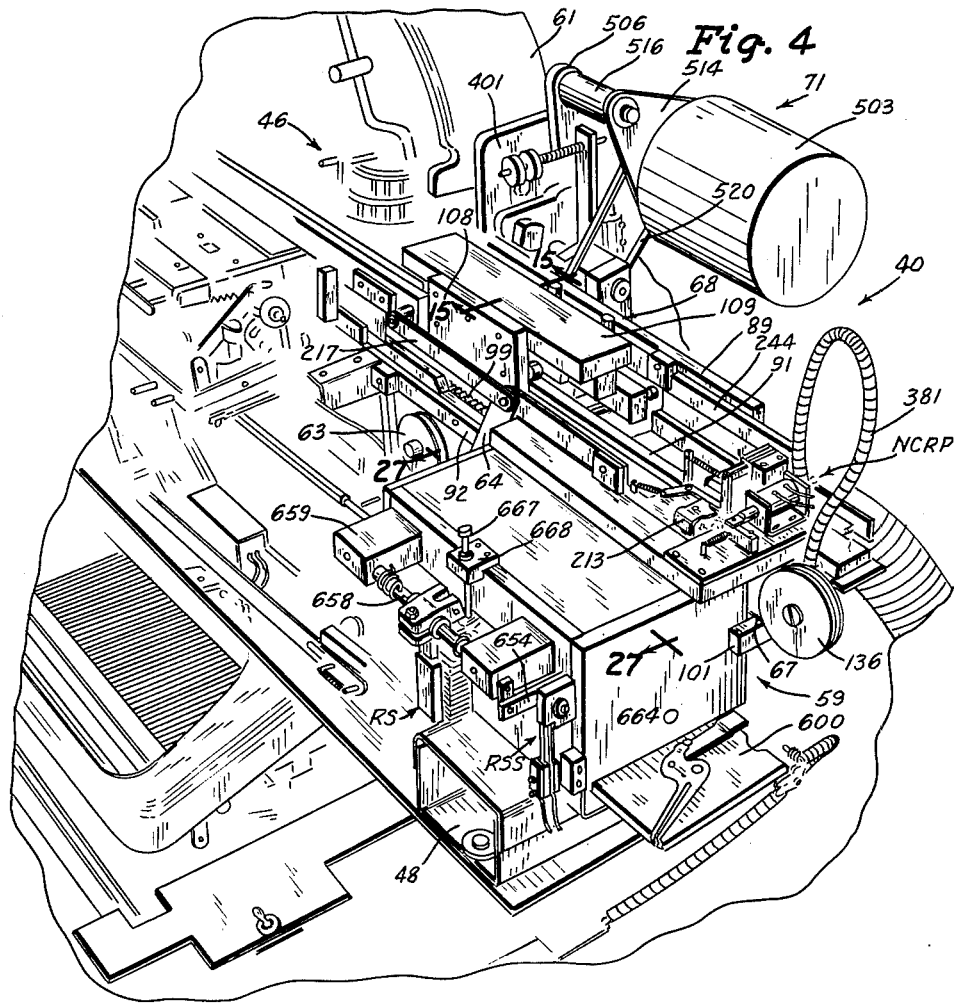
FIG. 4 is an enlarged fragmentary perspective view of the machine from the right front.
Figure 6:
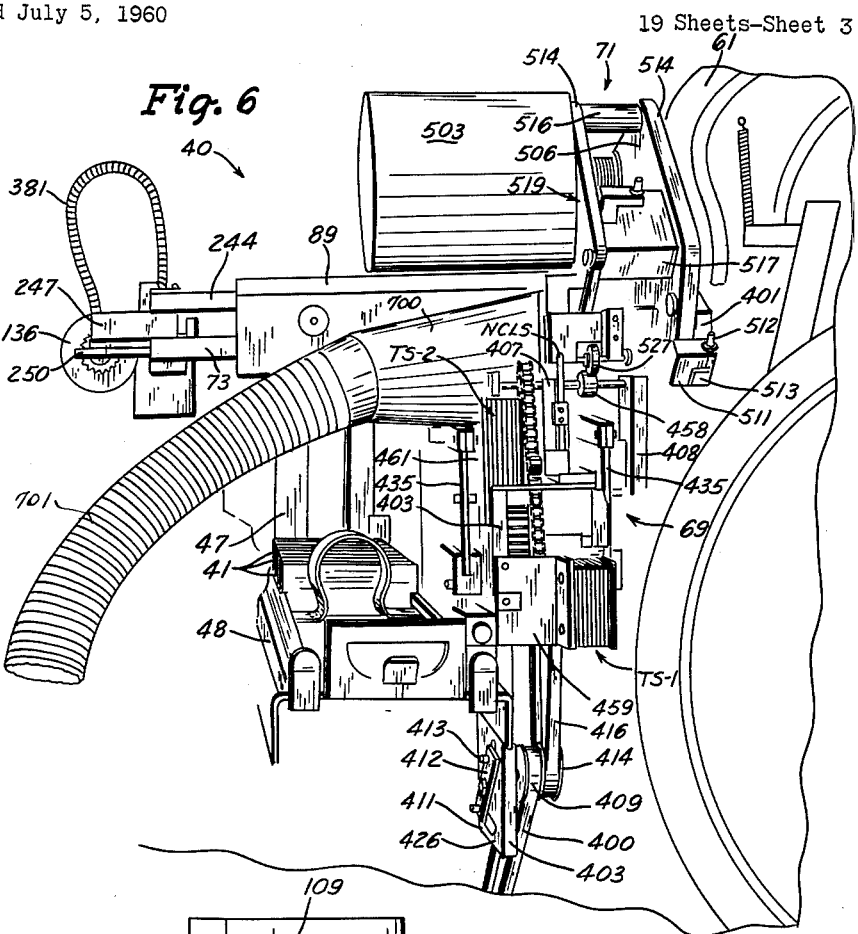
FIG. 6 is an enlarged fragmentary perspective view of the machine from the left rear.
Figure 18A:
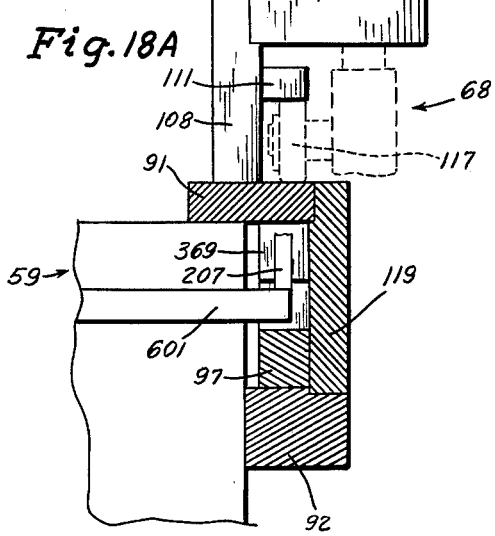
Figure 24:
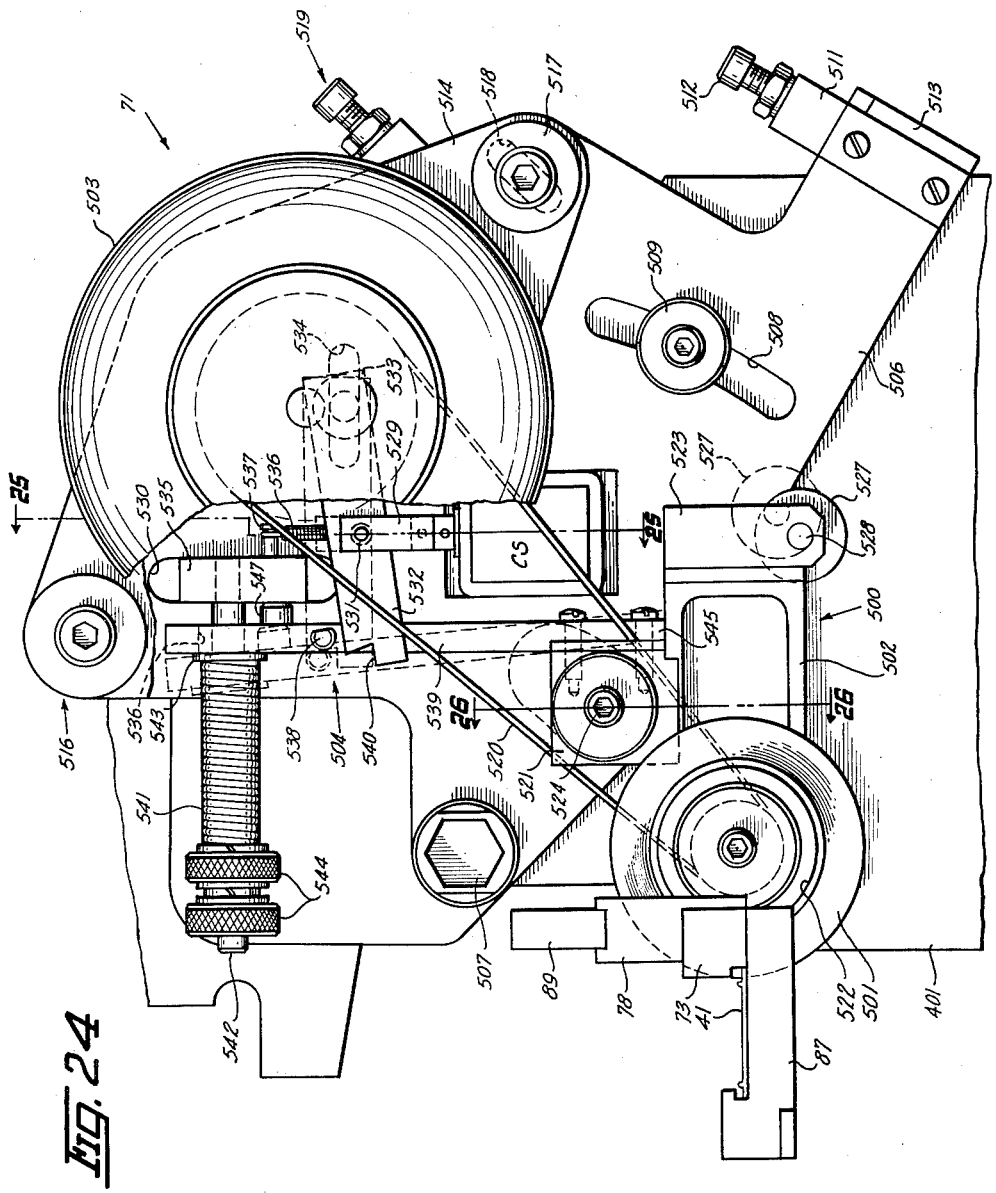
Figure 25:
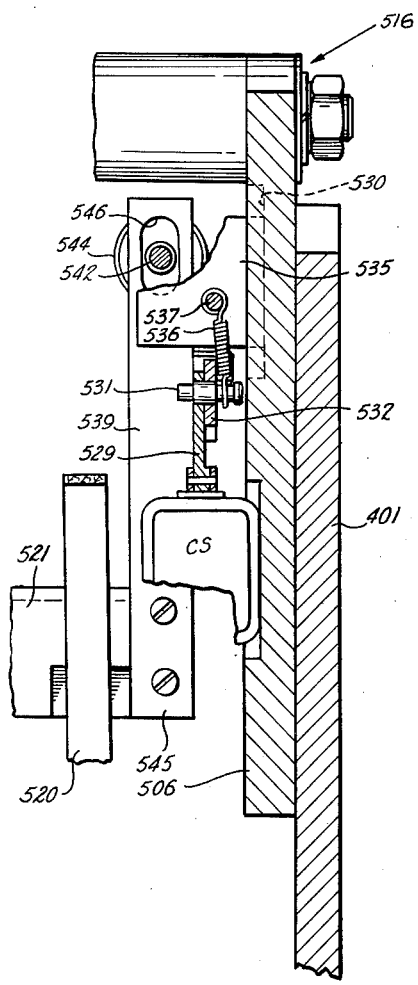
Figure 26:
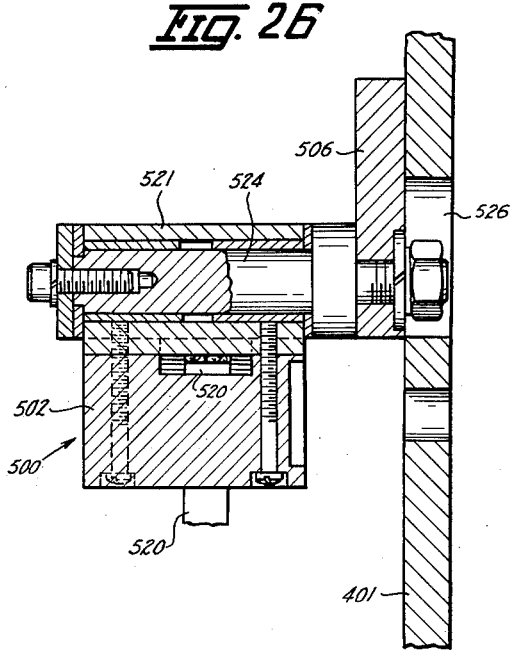

FIGS. 8 and 8A respectively are enlarged front and side views of the plate discharge lever trip solenoid device for the machine;

FIGS. 9 and 9A comprise together an enlarged plan view particularly of the structure and the plate feed mechanism for the automatic notching apparatus, certain parts broken away or not showing, and others shown in phantom and dotted line alternate positions for illustrative clarification;

FIGS. 10 and 10A comprise together an enlarged vertical sectional view taken longitudinally through FIGS. 9 and 9A along the line 10—10A therein, with a plate shown in all four stages therefor, and showing in FIG. 10A particularly the notching carriage in longitudinal vertical section;

FIG. 11 is a side elevational view of the plate clamp switch and associated parts and taken along the line 11—11 in FIG. 9;

FIG. 12 is a side elevational view of a pawl latch and taken along the line 12—12 in FIG. 9A;

FIG. 13 is a transverse cross sectional view taken along the line 13—13 in FIG. 10;

FIG. 14 is a transverse cross sectional view taken along the line 14—14 in FIG. 9A;

FIG. 15 is an enlarged transverse vertical cross sectional view of particularly the notching carriage, and taken along the line 15—15 in FIG. 4;

FIG. 16 is an enlarged view primarily in plan of the tail guide structure and the latch release relay, and taken along the line 16—16 in FIG. 15;

FIG. 17 is an enlarged view primarily in plan of the plate stage of the notching carriage, and taken along the line 17—17 in FIG. 15;

FIG. 18 is an enlarged fragmentary view taken along the line 18—18 in FIGS. 9 and 9A, and showing in particular the rack structure and associated parts for returning the notching carriage, with certain parts broken away for purposes of clarity;

FIG. 18A is an enlarged, fragmentary sectional view taken along the line 18A—18A in FIG. 18, with certain parts deleted for illustrative clarification;

FIG. 19 is an enlarged fragmentary rear elevational view, and showing in particular the actuating mechanism;

FIG. 20 is a vertical sectional view taken along the line 20—20 in FIG. 19, and showing in particular the toggle linkage for raising the plate stage of the notching carriage;

FIG. 21 is a vertical sectional view taken along the line 21—21 in FIG. 19, and showing in particular the toggle linkage for lowering the plate stage and the gear train therefor, certain parts broken away for purposes of illustration;

FIG. 22 is an enlarged fragmentary rear elevational view similar to FIG. 19, and with certain parts removed to show particularly a clutch arrangement;

FIG. 23 is an enlarged fragmentary view in side elevation primarily, and taken along the line 23—23 in FIG. 22 to show particularly the solenoid for the actuator clutch;

FIG. 24 is an enlarged side elevational view of the cutter mechanism as seen when looking from left to right in FIG. 6, with certain parts broken away and with parts of the actuator mechanism not shown for illustration purposes;

FIG. 25 is a fragmentary sectional view taken along the line 25—25 in FIG. 24, and showing in particular the cutter latch solenoid;

FIG. 26 is a fragmentary sectional view taken along the line 26—26 in FIG. 24;

FIG. 27 is an enlarged vertical longitudinal sectional view taken along the line 27—27 in FIG. 4, and showing the stop mechanism for the notching carriage.

FIG. 28 is a vertical transverse sectional view of the stop mechanism of FIG. 27, taken along the line 28—28 in FIG. 27;

FIG. 29–32, inclusive, are enlarged detail side elevational views of the four different solenoid arrangements of FIG. 28;

FIG. 33 is a sectional view of one solenoid arrangement taken along the line 33—33 in FIG. 30;

FIG. 34 is an enlarged perspective schematic view of the structure for positively clearing the stop mechanism; and FIG. 35 is a diagram of the electrical circuit for the automatic notching machine.

Figure 5:
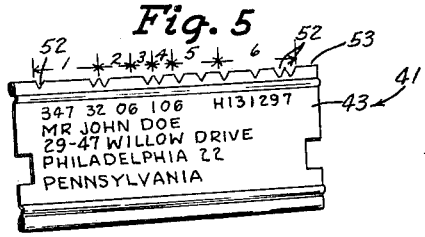
FIG. 5 is a perspective view of a plate which has been embossed and notched.

Referring now to the drawings, the invention is an automatic code notching apparatus, indicated generally at 40 in FIG. 1, which comprises an assembly of mechanisms and controls designed to permit automatic notching of metal plates 41 (FIG. 5) commercially manufactured under the trademark "Speedaumat," or the like, on a class 6700 Graphotype machine manufactured by the Addressograph-Multigraph Corporation and covered by Patents No. 2,444,292, 2,450,725, 2,463,690, 2,498,038, 2,533,366 and others. It is to be remembered, however, that the apparatus 40 can not only be applied specifically to the Graphotype and like machines, but can also be used in other envisionable arrangements.

The machine 42 is utilized primarily for automatically embossing on a plurality of plates 41 (FIG. 5) the name and address of a party and a code line 43 which pertains to certain information as regards the party. This information is tailored to the desires of the machine user and may contain such data, for example, as the week and year of expiration of a publication order, the term of the order, the source of the order, the type of the order, and the business and title classification of the party, etc.

As is well known to those in the art, the machine 42 draws each plate 41 from a feed magazine 44 (FIG. 1), moves the plate to the right as viewed to an embossing unit 46 (FIG. 4), and then moves the plate further to the right to a discharge chute 47 (FIG. 6) where it drops by gravity to a plate receiving magazine 48. The embossing is controlled in response to a tape reading mechanism 49 (FIG. 1) which interprets character and special function codes represented on a tape 51 by permutable rows of perforations, and mechanically transforms the taped information to the embossed characters on the plate 41.

The invention is directly concerned with the coded characters in the top line 43 on each plate and has as its object the application of the exact coded information in this line 43 to the plate in the form of notches 52 cut therein. Without going into detail unnecessary to the mechanical and electrical application of the invention, the data mentioned hereinbefore in line 43 falls into distinct areas or zones if you will, and the zones are utilized by dividing one edge 53 of the plate into such zones, six being indicated by the numbers 1 through 6, and within which zones one or more notches are utilized in various permutable coded combinations to record the embossed information for subsequent mechanical or electrical reading or sensing. It is appreciated thus, that the notches 52, in much the same manner as punched holes in punched cards and punched holes in teletype tape, can be sensed by other devices directly from the plates rather than from the use of the plates as a printing stencil. The sensed information can be used for many control and selection purposes.

The automatic notching apparatus 40 is used in conjunction with a universal notching automatic computer 54 (FIG. 1), hereinafter referred to as UNAC, which although a part of the invention will not be described in detail due to its obvious construction. As is known in the art, the basic components of the computer 54 are (1) a functional control which is an assembly of relays for controlling the read-in and read-out function; (2) input equipment which includes (a) reader switches 56 (FIGS. 1 and 7) mounted on a bar 57 at the lower front of the machine 42 and actuated by decimal levers 58 moved in accordance with the sensing by the machine 41 of the tape code, which switches 56 provide the decimal input to UNAC from the tape reading mechanism 49, (b) a stepping switch assembly which serves as the UNAC programmer, identifying units, tens and hundreds digits, timing functional control operations, etc., and (c) relay assemblies which translate decimal information to a binary form for the summing operation on the notching codes; (3) a calculator which is an assembly of three input binary adding units whose function is to receive binary code for two or three numbers in sequential mode and deliver binary code for the sum of the numbers received; (4) register equipment which includes (a) zone control equipment which channels the output of the calculator to the proper notch storage location, and (b) a notch register comprising an assembly of relays which serves as a temporary storage location for notch code and consists of two registers to permit simultaneous registrations and read-out functions; and (5) output equipment including (a) a notcher control switch which is a multi-point stepping switch assembly which transforms information from the register equipment to the carriage stop mechanism during each notching operation, (b) relays which serve to connect the notcher control switch to the notching solenoids in the apparatus 40, and (c) a carriage stop mechanism 59 (FIG. 2) which although mounted with the apparatus 40 may be considered also a part of UNAC by virtue of its read-out function.

With respect to the attachment of the automatic notching apparatus 40, hereinafter referred to as the "notcher," to the machine 42, the latter is ordinarily equipped with a mounting bracket (not shown) to the right of the rounded frame 61 (FIG. 4) and above a guide track 62 (FIG. 10) used for transferring the plates from the embossing unit 46 (FIG. 4) to the discharge chute 47 (FIG. 10A). By removing the mounting bracket and removing a section of the guide track plus the relocation of the return reel 63 (FIG. 4) for the machine embossing carriage (not shown), the notcher 40 can be readily affixed to the machine.

Before describing in detail the structure of the notcher 40, a brief description will be made of its main components and operation in conjunction with the machine 42. Basically, the notcher 40 comprises a structural elongated framework mounted to the right of the embossing unit 46, the carriage 45 of which is shown in FIG. 10, and extending over the discharge chute 47 wherein a guide track, partly stationary and partly movable, aligned with the machine guide track 62 (FIG. 10) is provided. Reciprocally mounted on the framework for movement longitudinally thereof is a plate feed structure best shown in FIGS. 9, 9A, 10 and 10A, and including three overhanging pawls best seen in FIGS. 10 and 10A for moving the plate from one stage of operation to another. Movement of the plate feed structure is tied in with the embossing machine 42 by means of a plate discharge lever 64 (FIG. 2) pivotally mounted at its lower yoke-like end 66 to the machine 40 and oscillated back and forth, or left and right as viewed in FIG. 2, by the action of an arm 67 one end (not shown) of which is driven by the action of a single revolution clutch for the machine 42.

One of the aforementioned stages, wherein the plate 41 is moved from a post-embossing stage to a discharge stage, includes the use of a carriage mechanism, indicated generally at 68 in FIGS. 10A and 15 which is reciprocally mounted by rollers on the framework for longitudinal movement thereof and relative to the machine 42. The carriage mechanism 68, the top of which shows in FIG. 4, is adapted to receive a plate by action of the feed structure, clamp and accurately locate the plate, and move the plate to the right (FIG. 4) under control of a return reel 136 connected to the carriage mechanism 68 by a spring wound cord 67 toward the discharge chute 47.

As the carriage mechanism 68 moves to the right, it passes an actuating mechanism, indicated generally at 69 in FIG. 6 and mounted on the machine 42 which is adapted to actuate the carriage mechanism to clamp and unclamp the plate 41 at the appropriate times. Additionally, the carriage mechanism 68 carries the plate 41 past a cutter mechanism indicated generally at 71 in FIGS. 4 and 6 and also mounted on the machine 42, which cutter mechanism 71 is mounted for an oscillatory movement toward and away from the carriage mechanism 68 for cutting the notches in the plate 41. It may readily be appreciated that to cut a code combination of notches in the plate 41 subsequent in time to the embossment of the same code in characters on the plate 41, not all the notches 52 (FIG. 5) possible to cut in the plate edge are necessarily cut.

To control, therefore, which notches are cut is the mechanical function of the carriage stop mechanism 59, mentioned hereinbefore and mounted as best viewed in FIGS. 2 and 4 on top of the plate receiving magazine 48 and in front of the framework for the notcher 40. This notch control is accomplished by the stop mechanism 59 stopping the movement to the right of the carriage mechanism 68 at any one of a number of positions, at which time the cutter mechanism 71 is electrically energized so as to make a cutting pass at the plate 41 and the edge 53 thereof. Of note, a total of twenty-four notches 52 on 0.100 inch center lines are possible along the edge 53 without destroying the utility of the plate 41.

Having a working knowledge of the notcher 40, its structural and electrical components are now described in titled sections. Although the main electrical components are described in detail hereinafter, an index of them as to their location and function are included as a part of this description.

*Automatic Notcher Framework*

The stationary framework for the notcher 40 includes an elongated rear section best shown in FIGS. 9, 9A, 10 and 10A, and an elongated front section parallel to and spaced forwardly of the rear section and best shown in FIGS. 2, 18 and 18A. The rear section includes at the bottom a pair of elongated, substantially square in cross section, plate guides 72 and 73 mounted in longitudinal alignment and whose inner ends 74 and 76 (FIG. 10), respectively, are spaced apart. Inner and outer are used here in relation to the longitudinal center of the framework. Mounted on the top of the plate guide 72 at its left end (see FIGS. 10 and 13) is a limit bar 77, and another limit bar 78 (FIGS. 10A and 14) is mounted on the right end (FIG. 10A) of the right plate guide 73. Mounted on top of and extended across both limit bars 77 and 78 is an elongated brace 89 (FIGS. 9 through 10A), on the front face of which is formed a cutout 90 for a purpose to appear hereinafter. It is noted that the inner ends 79 (FIG. 10) and 81 (FIG. 10A) of the limit bars 72 and 73 respectively are spaced longitudinally apart a considerably greater distance than the plate guide ends 74 and 76 and as will be seen hereinafter, provide left and right travel limits for a pair of rear rollers 82 and 83 (FIG. 10A) mounted on the carriage mechanism 68, and which rollers roll on the exposed top surfaces 84 (FIG. 10) and 86 (FIG. 10A) of the plate guides 72 and 73.

The plate guide 72 (FIG. 13), mounted on the guide track 62, is formed with an elongated lip 88 which faces another lip 80 formed on a short plate guide 85, whereby on the guide track 62 (FIG. 10) to the left of carriage mechanism 68, a four sided guideway is formed for the plate 41 as best seen in FIG. 13. To the right of the carriage mechanism 68, another guideway is formed above the discharge chute 47 (see phantom in FIG. 9A) by an undercut 75 formed along the lower inner corner of the right plate guide 73 and by an oppositely facing, undercut plate guide 110 secured to a side guide 119 (FIG. 14). The side guide 119 is mounted in an upstanding manner to the rear of the stop mechanism 59 between the upper and lower rack bars 91 and 92 and has mounted thereon an elongated pawl guide 121 (FIGS. 9A and 14) for a purpose described hereinafter.

The front section of the framework is comprised of a pair of vertically spaced upper and lower rack bars 91 and 92 (FIGS. 2, 15, 18 and 18A), respectively, which extend substantially the entire length of the framework. The lower rack bar 92 is secured at its left end end (FIG. 18) to a bracket 93 mounted on the embossing machine 42 and carries at that end a limit bar 94 having a sloped inner end 96. Another limit bar 97 (FIG. 18) also having a sloped inner end 98 is mounted on the lower rack bar 92 to the right of the bar 94, and therebetween a base rack 99 is longitudinally adjustably inserted into a space provided therefor in the bar 92. The right end 101 (FIG. 4) of the bar 92 extends beyond and about the right rear corner of the stop mechanism 59, to which it is secured. The left end 102 (FIG. 18) of the left limit bar 94 is secured to an upstanding bracket 103 the top of which supports the left end 104 of the upper rack bar 91 (FIGS. 2 and 18).

The upper rack bar 91, shown in cross section in FIGS. 13, 15, and 18A, is mounted at its right end 106 (FIGS. 9A and 18A) on the top of the stop mechanism 59 and is provided there with an elongated longitudinally extended slot 107 (FIG. 9A) for a purpose hereinafter described. At substantially the mid-point of the upper rack bar 91, an upstanding guide bracket 108 is mounted (FIGS. 2, 4, 15 and 18A), and to which is secured at the top thereof in an overhanging position, an elongated bearing track 109 (FIG. 15), and at the vertical center thereof a flat guide 111. The bearing track 109 has a pair of longitudinally aligned, elongated cutouts 112 and 113 (FIG. 18) formed in the underside thereof, each for receiving one of a pair of upper rollers 114 and 116 of the carriage mechanism 68, while a rear roller 117 of the carriage mechanism 68 is guided between the guide 111 and the inner surface 118 (FIG. 15) of the upper rack bar 91. To the left of the upper rack bar 91, an elongated drawbar rail 122 (FIGS. 9 and 13) is mounted thereon, and which is provided at each end with a notch 123 in which a gib 124 is fitted, each gib 124 being secured to the upper rack bar 91 by a cap screw 126 which is threaded through to the drawbar rail 122.

The framework includes further a tail guide arrangement for the carriage mechanism 68 and best shown in FIGS. 10A and 15. A tail guide bar 127 is provided with a slot 128 extended longitudinally and within which a depending carriage guide strap 129 is adapted to extend, whereby to prevent a transverse rocking motion of the carriage mechanism 68. Secured to the bar 27 at the left end thereof (FIG. 10A) is a bracket 131 (FIG. 16) for a solenoid designated hereinafter as LRS. The plunger 132 of the solenoid LRS is connected to a latch pawl 133 normally held by a spring 134 in a limited position wherein the latch pawl 134 engages the strap 129 so as to hold the notching carriage mechanism 68 in its left-most position. When the latch release solenoid LRS is energized, the latch pawl 134 is pulled away from the strap 129 and the carriage mechanism is free to be pulled to the right (FIG. 10A) by a carriage return reel 136 (FIG. 4) mounted on a bracket 137 (FIG. 9A) secured to the stop mechanism 59.

It is noted further that a pair of normally open, leaf-type switches CLS1 and CLS2 (FIG. 10A) are mounted on the tail guide bar 127 at the left and right ends thereof. When the carriage mechanism 68 is latched by the latch pawl 134, contact by the carriage mechanism 68 with a non-conductive part of CLS1 closes that switch, and likewise where the carriage mechanism 68 has been moved completely to the right on the tail guide bar 127, the switch CLS2 will be closed.

The bar 127 is connected to an elongated brace 138 which is mounted on an inner side of the inner one of a pair of brackets 139 and 141 (FIG. 2), used in conjunction with a support bar 142 for supporting the stop mechanism 59. Between the brackets, normally open, another leaf-type switch PDLL is mounted on the inner surface of the bracket 141, the switch PDLL being a limit switch and closed by contact with the plate discharge lever 64. Referring further to FIG. 2, a plate discharge lever switch PDLS is shown, and which as best shown in the rear view thereof of FIG. 3, is closed by a spring-biased pawl 143 only when the pawl 143 is moved from left to right (FIG. 2). The pawl 143 is pivotally mounted on a main bar 144 of the embossing machine 42 and can move clockwise (FIG. 3), but cannot move counter-clockwise due to a limit pin 146.

The main bar 144 (FIG. 2) is movable by the plate discharge lever 64, and the latter as mentioned hereinbefore is oscillated by a single revolution clutch (not shown) at the left of the machine 42 and adjacent the loading magazine 44. The clutch can be tripped for another rotation by a trip lever 1446 (FIGS. 1, 8 and 8A), and to provide for same a bracket 147 is mounted on a part 148 of the machine 42. The bracket 147 has a plate discharge lever trip solenoid PDLT mounted on the back thereof, and the plunger 149 of which rocks a pivot bar 151. The bar 151 is extended through an opening 152 formed in the bracket 147 for moving a latch pawl 153 clockwise as viewed (FIG. 8) whereby to move an end 154 of the trip lever 146 downward, thus tripping the clutch to allow another oscillatory movement of the plate discharge lever 64.

*Plate Feed Mechanism*

Each plate 41 is mechanically fed from a post-embossing stage, indicated at 41A in FIGS. 9 and 10, to an intermediate stage 41B where the plate is resting on the guide track 62, to a cutting stage 41C (FIGS. 9 through 10A) wherein the plate is carried by the carriage mechanism 68, and finally to a discharge stage 41D where the plate is poised above the discharge chute 47 and ready to drop down to the receiving magazine 43.

To accomplish this sequential feeding of each plate 41, and partially to return the carriage mechanism 68 from right to left, a carriage link 200 (FIGS. 9, 9A and 18) is pivotally fastened at one end to the upper end of the plate discharge lever 64, and is pivotally connected at the other end to a short draw plate 201 (FIGS. 9A and 18) the lower end of which is secured in the notched end of a flat slide 202 which slides back and forth against the right end 106 of the stationary upper rack bar 91. Mounted on top of the slide 202 is a short relatively flat pawl plate 203 on which a carriage pawl 204 is pivotally mounted, the pawl 204 being biased in a clockwise direction (FIG. 9A) by a spring 206.

As will be brought out hereinafter, the function of the pawl 204, is to engage the upper end of a switch arm 207 (FIGS. 18 and 9A) secured to the carriage mechanism 68. Of note, the position of the carriage return mechanism just described as depicted in FIGS. 9A and 18 is in its left-most location on the framework, with the pawl 204 in an engaged position. The mechanism for effecting the engaging movement of the pawl 204 when the latter is positioned to the right, includes a flat rectangular lock plate 209 (FIG. 9A) mounted on top of the upper rack bar 91 and the stop mechanism 59, and on which is secured a notching carriage return pawl solenoid NCRP. The plunger 211 for the solenoid NCRP is pivotally connected to a pivot arm 212 spring-biased in a counter-clockwise direction away from the pawl 204.

Upon an energization of the solenoid NCRP, the pivot arm 212 forces the pawl 204 against the tension of the spring 206 and into a hooked or engaged position about the carriage switch arm 207. During movement of the carriage return mechanism from right to left (FIG. 9A) the pawl 204 is retained in the engaged position by an irregularly shaped shield 213 (FIGS. 9A and 12) mounted on the slide 202, a depending lip 214 of the shield contacting the pawl 204. The shield 213, made of shim steel, is flexed upwardly, when the pawl 204 is to the right (FIG. 9A), on top of the pivot arm 212 by coaction therewith with a curved lip 216. Upon energization of the solenoid NCRP when, as mentioned before, the pivot arm 212 moves clockwise (FIG. 9A) to pivot the pawl 204 counterclockwise, upon movement of the pawl 204 to the left, the shield 213, upon the lip 216 being pulled off of the pivot arm 212, flips downwardly due to the flexed nature of the shield, and the lip 214 falls in behind the pawl 204. Upon a return of the pawl 204 to the right, the lip 216 contacts the now returned pivot arm 212 and flexes the shield 213 upwardly to remove the lip 214 from the return path of the pawl 204.

Referring again to FIG. 9, the drive for moving the three pawls shown in FIGS. 10 and 10A again emanates from the upper end of the plate discharge lever 64 to which an elongated drag link 217 is connected at one end. The other end of the drag link 217 is pivotally connected by a stud 219 to a drawbar plate 220 longitudinally adjustably connected between an elongated base bar 221 and a clamp 222. The base bar 221 is secured at its center as best viewed in FIG. 13 to a short drawbar slide 224 having a pair of grooves 225 formed in each end thereof.

The slide 224 is reciprocally movable between the stationary drawbar rail 122 and another drawbar rail 226 mounted thereabove, both rails 122 and 226 being interconnected at their ends in a vertically spaced manner by the upright gibs 124. It is readily appreciated that the gibs form left and right limits for the reciprocal movement of the slide 224.

An irregularly shaped base element 227 (FIGS. 9 and 13) is secured to the slide 224 and is connected at its upper inner side to an actuator block 229 and at its lower inner side to a pawl carrier 230. The carrier 230 (FIGS.

10 and 13) has pivotally carried thereon a transfer pawl 231 biased in a counterclockwise direction as viewed in FIG. 10 by a spring 232 secured to the pawl carrier 230. The function of this pawl 231 is to transfer a plate 41 from the post-embossing stage 41A (FIG. 10) to the intermediate stage 41B. A horizontally disposed backstop screw 231a secured to the pawl carrier 230 is provided for maintaining the pawl 231 in its FIG. 10 position.

By virtue of an elongated guide rod 233 (FIGS. 9 and 10) which is inserted through the actuator block 229, a lost motion is effected between the block 229 and an L-shaped bracket 234, the threaded end 236 of the guide rod 233 being inserted into an arm 237 of the bracket 234. By this arrangement, upon a movement of the aforementioned mechanism including the actuator block 229 from the left-most position illustrated in FIG. 9 toward the right, the bracket 234 will not be moved to the right until the face 238 of the actuator block 229 contacts the arm 237 thereof, whereupon the bracket will also be moved to the right. The bracket 234 has mounted therebelow a pawl carrier 239 (FIG. 13) to which is pivotally connected a loading pawl 241 (FIG. 10), biased by a spring 242 in a clockwise direction and limited in such movement by a stop screw 243 secured to the bracket 234. The function of the loading pawl 241 is to move a plate 41 from the intermediate stage 41B (FIGS. 9 and 10) to the carriage stage 41C. The purpose for the lost motion between the actuator block 229 and the bracket 234, both of which carry respectively the transfer pawl 231 and the loading pawl 241, is that the distance of movement from the post-embossing stage to the intermediate stage is greater than that between the intermediate stage and the carriage stage, thus the transfer pawl 231 must move longitudinally of the machine a greater distance than the loading pawl 241.

The bracket 234 is connected along its inner edge to an elongated tie bar 244 which extends substantially the entire length of the apparatus 40 within the cutout 90 formed in the brace 89, the tie bar 244 being retained in the groove by a plurality of clips 246 (FIGS. 10 and 10A). The right end of the tie bar 244 is secured to an L-shaped bracket 247 the lower portion of which is adjustably connected between a clamp 248 and a substantially rectangular pawl carrier 249, the latter provided with a cutout portion 251 (FIG. 9) in the left end thereof. The pawl carrier 249 is mounted on a slide member 250 (FIG. 14) adapted for sliding reciprocal guided movement between the plate guide 73 and the combined plate guide 110 and pawl guide 121.

A spring stop member 252 is mounted on the pawl carrier 249 for holding a spring 253 inserted under compression between the stop 252 and the upright end 254 of a pawl pivot 256. The pawl pivot 256 is pivotally connected for movement about a horizontal axis within the cutout 251 to the pawl carrier 249, and is limited in its counterclockwise movement (FIG. 10A) by a stop screw 257 inserted through a pawl stop 258 (FIG. 9A) which is mounted on the inner left corner of the pawl carrier 249.

An elongated delivery pawl 259 (FIGS. 9A and 10A) is secured at one end to the underside of the pawl pivot 256, and is provided with a downwardly hooked outer end 261. As illustrated in FIGS. 9A and 10A, the delivery pawl 259 is in its left-most position, where upon the carriage mechanism 68 being moved to the right for notching a plate 41, the delivery pawl 259 can then upon a movement of the plate discharge lever 64 from left to right move the plate 41 from the carriage stage 41C to the discharge stage 41D. It must be noted, referring particularly to FIG. 10A, that as the carriage mechanism 68 is depicted in its left-most position, as is the delivery pawl 259, the latter is moved to the right in order to leave the carriage stage 312 free to raise and lower, as will be brought out in detail hereinafter.

*Notching Carriage Mechanism*

The carriage mechanism 68 is illustrated particularly in FIGS. 10A, 15, 17, and 18 and includes a vertically disposed, substantially rectangular carriage bar 300 (FIG. 15) provided adjacent the top with a reamed opening 301, and having another opening 302 formed slightly below the top. A cutout 303 is formed on the back side of the bar 300 adjacent the opening 302, and therebelow the bar is sloped at 304 toward a large opening therein forming legs 306 and 307 (FIG. 10A). Slidably mounted about the front and sides of the bar 300 for vertical movement thereon are a pair of irregularly shaped stage brackets 309 each having a portion 311 extended rearwardly or behind the bar 300, an elongated stage 312 being secured to the brackets 309 for vertical movement therewith.

The stage 312, used for supporting a plate 41 on its upper surface 313 (FIG. 15) during the notching pass, has a slot 314 formed longitudinally thereof, closed off at the bottom by a stage key 316, and within which a positioning pawl 317 (FIG. 10A) and a latch 318 are pivotally mounted, both shown in full lines in their normal position. The pawl 317 is biased counterclockwise by a spring 315 and which movement is limited at 319 by the stage 312. The latch 318 is biased upward by a spring 310 inserted between the latch and the stage key 316, and is also limited by a stop pin 321 inserted therein. To enable the loading pawl 241 (FIG. 10) to push a plate 41 into the carriage mechanism 68, whereupon the latch 318 (FIG. 10A) is depressed, without tripping or raising the nose 262 of the pawl 241, the latch 318 which is directly in the path of the pawl 241 is provided with a groove 322 in its exposed tip 323 through which the pawl nose 262 passes. It should be noted here that a plate guide 320 (FIGS. 10A and 17) is mounted at each corner of the stage 312 so as to form a short guideway therewith when the plate 41 enters and leaves the stage.

However, to ensure that the pawl nose 262 is raised as soon as it passes the latch tip 323, so that the stage pawl 317, which has been pivoted to the right (FIG. 10A) by the plate 41, can properly relocate the plate 41, as soon as the loading pawl nose 262 passes to the right of the latch tip 323, the depressed tip 323 is free to kick up under the compression of its spring 310 and kicks the loading pawl 241 upward and away from the plate 41. The stage pawl 317 is then free to force the plate back to the left and up against the tip 323 whereby it is then properly located longitudinally on the stage 312.

Spaced directly above the vertically movable stage 312 is a stationary clamp 324 of approximately the same length as the stage 312, and which is secured to the bar 300 within the cutout 303. The clamp 324 is cut back in a dovetail manner on its lower surface to retain a rubber insert 326 against which the plate 41 is pressed when the stage 312 is raised, it being shown in FIG. 15 in its lower position. On the back side of the clamp 324 and adjacent the corners are mounted a pair of stationary corner guides 327 (FIGS. 15 and 17), and on the front side of the clamp 324 is mounted a single side guide 328. The side guide 328, of considerably more length than the corner guides 327 is biased about its pivot 329 to the clamp 324 in a counterclockwise direction (FIG. 15) by a spring 331, which is extended between the side guide 328 and an end piece 332 mounted on a stud 333 extended through the bar opening 302 and a bore in the side guide 328 and threaded into the clamp 324. It will thus be seen that upon a raising of the plate 41 by the stage 312 (FIG. 15), the said guide 328 acts to force the plate slightly to the right and up against the corner guides 327 whereat it is clamped securely into the rubber insert 326 when notched by the oscillatory cutter wheel 501.

To force the plate 41 downward after the notching thereof and when the stage 312 is lowered, a pair of hollow stripper barrels 334 (FIGS. 10A and 15) are mounted on the clamp 324, each of which includes an elongated depressible rod 336 secured at the top to a stop 337 adapted for seating in a cap 338. A spring 339 mounted on the rod 336 between a washer 341 and an enlarged part of the rod 336 enables the rod to be depressible. Thus, upon a lowering of the stage 312, the downward movement of both stripper barrel rods 336 ensures the lowering of the front edge 53 of plate 41 back onto the stage surface 313. To ensure the lowering of the rear edge 335 (FIG. 17) of the plate 41 simultaneously with the front edge thereof, a pair of flat stripper plates 340 (FIG. 17) are mounted on the tops of the stage brackets and extended so as to overhang the stage 312 and the plate edge 335. Thus, upon a lowering of the stage and the brackets, the plates 340 contact the plate rear edge 335 and force it downwardly. Thus by the provision of the stripper barrel rods 336 and the plates 340, the plate 41 is forced downwardly out of its clamped position between the side guide 328 and the corner guides 327.

At the lower end of the bar 300, a toggle stop plate 342 is secured, which holds the aforementioned guide strap 129, and through which a limit screw 343 is threaded for limiting the counterclockwise rotation of a toggle pivot plate 344. The plate 344, pivoted at 346 to the bar 300, is provided at its outer end with a toggle stud 347 extended therethrough and pinned into the stop plate 342. A pair of knurled nuts 348 are threaded on the top of the stud for adjusting the compression force of the spring 349 against the plate 344 for holding it against the limit screw 343. Thus, by virtue of the inner end of the plate 344 being connected to the stage 312 through a toggle bar 351 and a hinge 352, adjustment of the plate 344 and spring 349 enables an adjustment of the stage 312 for sufficient clamping force on plates of varying thickness according to the embossing thereof, while at the same time permitting vertical adjustment of the stage 312 to the same level at the track 62 (FIG. 9). It can thus be readily appreciated that by adjusting the compression force on the stage 312 sufficiently to clamp a plate 41 having no embossment thereon, the compression force for a plate with embossment is automatically adjusted.

Connected to the hinge pin 353 (FIG. 15) between the bar 351 and the hinge 352 is a toggle link 354 which extends rearwardly to a connection with a yoke-like crosshead 356 having a drawbar 357 inserted through its end. Both the link 354 and the crosshead 356 are reciprocally guided between a pair of elongated toggle guides 358 (FIGS. 10A and 15) secured at their front ends to the bar legs 306 and 307. A pair of covers 359 are provided for connection between the guides 358 above and below the hinge and crosshead. To ensure that the stage 312 is located properly in its lower position, a pair of stage rests 360 (FIG. 10A) are secured to the bar legs 306 and 307 and on top of which the stage brackets 309 are adapted to seat.

The carriage front roller 117 (FIG. 15) is mounted on a pin fixed in the bar opening 301, the top rollers 114 and 116 are mounted on a top guide 361 secured on top of the bar 300, and the rear rollers 82 and 83 are mounted on pins fixed in the clamp 324. To the front left plate guide 320 (FIGS. 9 and 11), a block of Micarta 362 is mounted for closing a normally open leaf-type plate clamp switch PCS mounted on a bar 363 secured to the plate guide 85. At the center of the bar 300, a gear 364 is rotatably mounted on a stud 366 inserted in an opening provided therefor in the bar 300, and adapted for movement along and in mesh with the stationary base rack 99 (FIG. 18). Above the gear 364 and in mesh therewith is a movable rack 367 the left end of which is connected to an elongated extension bar 368 and the right end of which is secured to a nose piece 369.

At the front or outer end of the nose piece 369, in which a longitudinal extended, vertically disposed slot 371 is formed, the switch arm 207 is pivotally mounted therein, and to the left of the arm 207, a switch bracket 372 is stationarily mounted in the slot 371 and with an upright projection 373 longitudinally aligned with the switch arm 207, as best shown in FIG. 9A. By virtue of a spring 374 between the projection 373 and the arm 207, the latter is normally maintained in a slightly inclined position (dotted lines in FIG. 18), a limit screw (not shown) secured to the underside of the bracket 372 being adapted to limit the counterclockwise movement (FIG. 18) of the switch arm 207. When the switch arm 207 is inclined, one leaf 377 of a cutter cycle switch CCS is not in contact with the other leaf 379 whereby the switch CCS is normally open, due to a pin 378 on the leaf 377 being forced to the left (FIG. 18) by the switch arm 207.

However, upon the lower end of the arm 207 striking a stop element of the stop mechanism 59, as hereinafter described, the arm 207 is forced to an upright position (FIG. 18) wherein the leaves 377 and 379 contact and the switch CCS closes. As the switch CCS is movable with a carriage return mechanism, a flexible cord 381 is provided therefor. It may be readily appreciated that as the rack 367 is movable with the gear 364 relative to the base rack 99, it is arranged that although, as will be described hereinafter, the nose piece 369 is stopped by stop elements 601 on 0.200-inch centers, the notches will cut on 0.100-inch centers, due to the gear 364 moving only half the distance that the rack 367 moves.

*Actuator Mechanism*

The actuator mechanism indicated generally at 69 in FIG. 6, is adapted to receive drive from the machine 42 via a belt 400 (FIG. 6), raise the carriage stage 312 (FIG. 15) by operating the toggle linkage drawbar (FIGS. 15 and 20) when the carriage mechanism 68 is in the pre-notching position (FIGS. 9 and 9A), lower the stage 312 when the carriage mechanism 68 is in a post-notching position, and to oscillate the cutter mechanism 71 for pre-selected notching of the plate 41.

To mount the actuator mechanism 69, a base plate 401 (FIGS. 19–22) is secured flat to the machine 42 in a vertically disposed manner, and to which a longitudinally extended support member 402 is secured at one end thereof. Extended rearwardly from the support 402 are a pair of parallel, vertically disposed brackets 403 and 404, spaced longitudinally of the machine 42 and connected across their top by a cover 406. To the upper right of the base plate 401, a pair of parallel, longitudinally spaced bearing brackets 407 and 408 are mounted in an upstanding manner.

The drive from the belt 400 (FIG. 6) is received by a pulley 409 adjustably mounted on the lower end 411 of the left bracket 403 by means of a swingable plate 412 pivoted to the left bracket by a pivot pin 413 which is slidably mounted in a vertical slot 415 formed in the bracket end 411. An idler pulley 414, mounted as a unit with the pulley 409, transfers the drive via another belt 416 to a drive pulley 417 (FIGS. 19 and 21) rotatably mounted on a stud 418 secured to the left bracket 403. Adjacent to the drive pulley and rotated thereby, a drive gear 419 is rotatably mounted on the stud 418, and which gear 419 is in mesh with an idler gear 421 mounted on a drive shaft 422 mounted at both ends in the left and right brackets 403 and 404.

The idler gear 421 is also in mesh with a clutch gear 423 (FIGS. 19 and 21) at its lower front, and the clutch gear 423 is fixedly mounted on a rotatable clutch body 425 rotatably mounted on a clutch shaft 424 (FIG. 22) on which is keyed a single revolution clutch unit 426 having an eccentrically mounted stud 427 (FIGS. 22 and 23). The clutch shaft 424 extends through the brackets 403 and 404 (FIG. 22) and has a crank 428 mounted on each exposed end thereof, each crank 428 having an eccentrically mounted crank pin 429 secured thereto.

Referring particularly to FIG. 20 wherein the right toggle actuating linkage 430 is disclosed for pulling rearwardly the notching carriage drawbar 357 (FIG. 15) to raise the plate stage 312 so as to clamp a plate 41 prior to being notched, it is seen that the right crank pin 429 is pivotally connected to an upright connecting rod 431 the upper end of which serves as a hinged connection between a toggle bar 432 and a hinge 433. The toggle bar 432 is pivotally connected to the support 402, and the hinge 433 is pivotally connected to the mid-point of an actuator lever 435. The lower end of the actuator lever 435 is pivotally connected to a stop plate 434 secured by a pivot pin 436 to the right bracket 404 and the lower end of which is connected to a unit 437 for adjusting the position of the stop plate 434 about its pivot.

The adjusting unit 437 is mounted on a bracket 438 secured to the right bracket 404 (FIG. 19). The upper end of the actuator lever 435 (FIG. 20) is inserted in the slotted rear end of an actuator 439, the front end 441 of which is cut out for applying a pull to the notching carriage drawbar 357. The actuator 439 is secured along its lower edge to a slide plate 442 (FIGS. 19 and 20) by nuts 443 and which plate 442 is adapted to slide back and forth between a slot 444 in the support 402 and a pair of gibs 446 mounted on top of the support 402 and extended partially over the slot 444.

Referring particularly to FIG. 21, with the exception of connecting rod 447 being shorter than the corresponding rod 431 (FIG. 20), and the actuator 448 being cut at its front end 449 only for pushing the notching carriage drawbar 357, the left toggle linkage 451 is identical to the right toggle linkage 430 with like parts being indicated by like numbers. It will be appreciated that when the notching carriage mechanism 68 has moved from in front of the right toggle linkage 430, as seen from the rear in FIG. 19, to in front of the left toggle linkage 451, the plate 41 held clamped by the carriage mechanism 68 will have been notched and ready to be lowered for withdrawal by the delivery pawl 259 (FIG. 10).

Referring to FIG. 21, the drive shaft 422 for the idler gear 421 has a drive sprocket 452 secured thereto and which rotates via a chain belt 450, a cam sprocket 453 mounted on a cam shaft 456. A switch cam 454 is mounted on the drive shaft 422 for a reason hereinafter described. The cam shaft 456 is rotatably mounted in the bearing brackets 407 and 408 and carries a switch cam 457 on an extension thereof, while having secured thereto between the bearing brackets an eccentrically mounted knife cam 458. As seen in the next section on the cutter mechanism 71, the constantly rotating knife cam 458 continually partially oscillates the cutter unit 500 of the mechanism 71.

There are four electrical components mounted with the actuator mechanism 69. As best viewed in FIG. 6, a bracket 459 mounted on the left bracket 403 holds a cutter cycle timing switch TS–1 which is actuated by the switch cam 454 (FIG. 19). This switch is closed once during each revolution of the constantly rotating drive shaft 422. To the upper left of TS–1, another bracket 461 secured to the upper portion of the left bracket 403 mounts a stop retractor timing switch TS–2 which is actuated by the switch cam 457 (FIG. 19) and closed once during each revolution of the cam shaft 456.

Mounted on the left bearing bracket 407 (FIG. 6), is a leaf-type notch complete limit switch NCLS which is normally closed by coaction with a spindle carriage 502 which is a part of the cutter mechanism 71, but which opens momentarily just before the cutter 501 (FIG. 15) reaches full depth. Referring now to FIG. 23, the actuator solenoid AS is shown which is mounted on the machine 42. The plunger link 462 from the solenoid AS is pivotally connected at its outer end by a pin 460 to a clutch pawl 463 pivoted by a pin 464 to the right bracket 404 (FIGS. 22 and 23). The pawl 463 is normally held in an upright position by a biasing spring 466, and wherein the pawl 463 acts as a stop for the stud 427 whereby drive from the clutch gear 423 is not transmitted to the clutch shaft 424 for the toggle linkage 430 and 451. However, upon the energization of the solenoid AS, the pawl 463 is pivoted away from the stud 427, and the single revolution clutch unit 426 is adapted to rotate the clutch shaft 424.

*Cutter Mechanism*

The cutter mechanism 71 (FIGS. 24, 25 and 26) is comprised basically of the cutter unit 500 which carries the cutter 501 for actually cutting the notches 52 in a plate 41, a motor 503 for rotating the cutter 501 and a latch unit 504 for controlling under electrical impulse the selection of when a cutting pass is made.

The frame for the cutter mechanism includes a flat irregularly shaped side plate 506 (FIG. 24) pivotally mounted in a side-by-side relation by a plate stud 507 on the base plate 401 (see FIG. 21) and provided with an arcuate slot 508 by which it may be adjustably connected by a cap screw 509 to the base plate 401 and locked. A stop bracket 511 for a stop screw 512 is provided at the rear of the side plate 506 for coaction with a stop plate 513 (FIGS. 24 and 6) to determine the arcuate location of the side plate 506.

As best shown in FIG. 6, a diamond shaped motor plate 514 (see also FIG. 24) for holding the motor 503 is supported on the side plate 506 in spaced relation by a longitudinally extended motor stud 516 adjacent the top of the plate 514 and by a cutter stop block 517 adjacent the lower area of the plate 514. A slot 518 (shown in dotted lines in FIG. 24) is formed in the motor plate 514 for the connection therewith by the stop block 517 providing thereby an adjustable arcuate mounting of the motor plate and the motor 503 for proper tensioning of a belt 520 (FIG. 4) which provides drive for the cutter unit 500. Another stop arrangement 519 is provided for the motor plate 514.

The cutter unit 500 includes the spindle carriage 502 (FIGS. 24 and 26) on the top of which is mounted a hinge block 521, at the front of which is mounted a conventional spindle assembly (not shown in detail) 522 for carrying the cutter 501, and at the rear of which is mounted a bearing bracket 523. The hinge block 521 is pivotally carried on a cutter stud 524 (FIG. 26) which is secured to the side plate 506, a cutout 526 being formed in the adjacent base plate 401 to accommodate an arcuate adjustment of the side plate 506.

Oscillation of the cutter unit 500 is caused by the coaction of a roller 527, mounted via a stud 528 on the bearing bracket 523, with the constantly rotating, eccentrically mounted cutter cam 458 (FIGS. 6, 19 and 21). Thus, by virtue of the cutter unit 500 being pivotally mounted on the side plate 506 by the cutter stud 524, for each rotation of the cutter cam 458, the cutter unit 500 is rocked slightly in a counterclockwise direction (FIG. 24). To cut a notch in a plate 41, however, the cutter unit and the cutter 501 must move in a clockwise direction about their pivot 524. Thus, as the eccentric cutter cam moves away from the roller 527 after contact, the roller 527 and the cutter unit 500 are adapted to follow the cam 458 in a clockwise rotational direction, as seen hereinafter.

The latch unit 504 either permits the cutter unit 500 to completely follow the cutter cam 458 so as to perform, by the cutter 501 a notching pass, or prevent it depending upon the action of a cutter latch solenoid CS (FIGS. 24 and 25). The plunger for the solenoid CS is pivotally connected to a link 529 which in turn is pivotally connected by a pin 531 to a latch 532 which is also pivotally connected at its rear end 533 to the side plate 506, a slot 534 in the plate 506 being provided for lateral adjustment of the latch 532.

A spring 536 is secured between the pin 531 and another pin 537 mounted in a plate 535 secured in a groove 530 to the side plate 506 for biasing the latch 532 in a normally horizontal manner against the bottom of the plate 535, as best indicated in dotted lines in FIG. 24. In this position, the notched front end 540 of the latch engages a stud 538 secured to and extended to one side of an upstanding tail bar 539. The tail bar 539, which is fastened at its lower end 545 to the hinge block 521, is biased at its upper end to the right or in a clockwise direction (FIG. 24) by means of a spring 541 mounted on a rod 542 and extended between a washer 543 against the tail bar 539 and a pair of adjusting nuts 544. The rod 542 passes through a slot 546 (FIG. 25) provided therefor in the tail bar and is inserted in the plate 535. By this arrangement, it can readily be appreciated that upon an energization of the solenoid CS to lower the latch 532 away from the tail bar stud 538, the tail bar 539 will be forced by the spring 541 in a clockwise direction (FIG. 24) and the cutter unit 500 to which the tail bar 539 is secured will pivot accordingly to force the cutter 501 into engagement with the plate edge 53 to cut a notch 52, all under the control of the cam roller 527 and the cutter cam 458.

Movement of the tail bar 539 is limited by a plug 547 secured thereto striking the plate 535. It can now be understood that the reason for the slight rocking or partial oscillation of the cutter unit 500 by the cutter cam 458 in a counterclockwise direction is for the purpose of taking the force of the spring 541 against the tail bar 539 off the latch 532 once every revolution of the cutter cam 458. By this arrangement, wherein the load against the latch 532 is periodically removed therefrom, the solenoid CS can be a conventional one sufficient only to pivot the latch 532 downwardly.

Carriage Stop Mechanism

The carriage stop mechanism, indicated generally at 59 in FIGS. 2 and 4, is shown in detail in FIGS. 27–34, inclusive, and includes twenty-four identical notching solenoids NS, electrically connected by a multi-point plug 600 (FIG. 4) to UNAC and particularly to the multi-point stepping switch thereof, for actuating twenty-four rack stop elements 601 aligned side-by-side on 0.200-inch centers. As best shown in FIGS. 18 and 18A, a stop element 601 is adapted, as described hereinafter, to be moved from a recessed position to an extended position directly in the path of the switch arm 207 for operation of the cutter cycle switch CCS, where, upon contact with the arm 207 and carriage rack nose piece 369, the notching carriage mechanism 68 is momentarily halted and held under tension for a notching pass of the cutter mechanism 69. As mentioned hereinbefore, due to the arrangement of the movable rack 367 and the carriage mechanism gear 364, the 0.200-inch movement of the rack 367 from the stop element 601 to stop element 601 is changed to an 0.100-inch movement of the carriage mechanism 68, thus enabling the notches 52 to be cut on 0.100-inch centers.

The stop mechanism 59 is encased in a housing including a pair of parallel, longitudinally spaced side plates 602 (FIG. 27) and 603, a top plate 604 (FIGS. 27 and 28), a front plate 606, and an L-shaped cover 607. An elongated lever frame 608, shown in cross section in FIG. 28 is secured in a longitudinally extended manner by an insert 609 at one end, and by another insert 611 and a bracket 612 at the other end between the side plates.

The frame 608 is provided with an enlarged bore 613 extended along the longitudinal axis thereof, and a quartet of longitudinally extended slots 614a, 614b, 614c, and 614d. Each slot is tangentially offset from the longitudinal axis of the frame 608, registers with the bore 613, and is laterally normal to the adjacent two grooves, the entire effect being one of an eccentric pinwheel. Adjacent to each slot 614a—614d, a ledge 616a, etc., is extended laterally parallel thereto and on each of which is mounted an elongated, flat bracket 617.

On one bracket 617, six solenoids NS1–6 are mounted thereon in a side-by-side manner, another row of six solenoids NS7–12 is mounted on the second bracket 617, another row of six solenoids NS13–18 is mounted on the third bracket 617 and on the fourth bracket 617 the fourth row of six solenoids NS19–24 is mounted. By longitudinally offsetting each bracket 617 from the adjacent one 0.200-inch, it will be appreciated that the respective plungers 618 of the solenoids in one row are offset that amount from the plungers 618 in the adjacent row, etc.

Referring to FIG. 27 twenty-four discs 619, one for each solenoid NS, are rotatably mounted in a side-by-side manner on a shaft 621 extended between the inserts 609 and 611 and along the longitudinal axis of the bore 613. The first disc 619A, designated hereinafter as "A," on the left end of the shaft 621 in FIG. 27 is shown in FIG. 32. This disc A is provided with a tangentially offset normally vertically disposed slot 622 in which is tightly fitted and secured by a pin 620 an upstanding lever 623, the upper end 624 of which extends through a longitudinally extended slot 626 (FIG. 27) in a stop guide plate 627 mounted below the top plate 604. The slot 626 has a transverse width greater than the width of the lever 623, as does the slot 614a to permit a circular movement of the lever 623 and the disc A about the shaft 621. This circular or arcuate movement is caused by energization of the first solenoid NS1 of the row NS1–6 which is connected to the center of the lever 623 by its plunger 618 (FIG. 32).

The disc 619B, hereinafter referred to as "B," on the immediate right of the disc A (FIG. 27), is illustrated in FIG. 31 as having a horizontally disposed tangentially offset slot 629, and a vertically disposed slot 631 longitudinally aligned with the slot 622 for receiving a lever 632 identical to the lever 623. The slot 629 has fixedly pinned therein a solenoid lever 633 which extends through the slot 614b (FIG. 28) for pivotal connection with the upright plunger 618 of the first solenoid NS7 of the row NS7–12, which row is mounted 90 degrees counterclockwise and offset 0.200 longitudinally from the row NS1–6.

The disc 619C, hereinafter referred to as "C" on the immediate right of the disc B in FIG. 27, is illustrated in FIG. 30 as having a tangentially offset, vertically depending slot 636 (FIG. 30), and a vertically disposed slot 637 longitudinally aligned with the slots 631 and 622 for receiving a lever 638 identical to the levers 632 and 623. The slot 636 has fixedly pinned therein a solenoid lever 639 which extends through the frame slot 614c (FIG. 28) for pivotal connection with the horizontally disposed plunger 618 of the first solenoid NS13 of the row NS13–18, which row is mounted 90 degrees counterclockwise and offset 0.200 longitudinally from the row S7–12.

The disc 619D, hereinafter referred to as "D," on the immediate right of the disc C in FIG. 27, is illustrated in FIG. 29 as being identical to the disc B, but turned 90 degrees so that another lever 642, identical to the levers 638, 632, and 623 is fixedly pinned in the slot 629, while a solenoid lever 643 is fixedly pinned in the slot 631 for extension through the frame slot 614d (FIG. 28). The lever 643 is pivotally connected to the first solenoid NS–19 in the row NS19–24 which is mounted 90 degrees counterclockwise and offset 0.200 inch longitudinally with respect to the row NS13–18.

It will be readily apparent that the disc 621 to the immediate right in FIG. 27 of disc D is identical to A, and that this second disc A carries the same linkage as depicted in FIG. 32 but for connection with the second NS2 (not shown) of six solenoids in row NS1–6. Likewise, the next disc to the right of the second disc A will be a second disc B (FIG. 31) for the second NS8 (not shown) of six solenoids in row NS7–12, etc. It is not thought necessary that the description be drawn out. Suffice it to describe that there are six discs A with identical linkage for the six solenoids in row NS1–6, six discs B with identical linkage for the six solenoids in row NS7–12, etc., as best illustrated in FIG. 27.

Referring to FIG. 28, the linkage for a solenoid, NS13 for example, is illustrated in normal position by the use of full lines. In this position with the solenoid NS13 de-energized, the lever 638 is vertically disposed with its rear edge 644 resting against the rear side 639 of the slot 626, and against the face of a guide bar 641 having a plurality of pins 642 (FIG. 27) mounted therein whereby two pins 642 straddle the levers 638 and the other levers designated. The upper end 643 of the lever 638, as do all the other upper ends of the other levers 642, 632, and 623, is extended in a slot 644 formed on the underside of an elongated, flat rack stop 601, shown in cross section in FIG. 27.

Each rack stop 601 is mounted in a transverse groove (not shown) formed as a guideway therefor in the underside of the top plate 604. The rear end 647 of each rack stop 646 is connected by a spring 648 to a longitudinally extended pin 649 secured to the top plate 604; and the front end 651 of each rack stop 601 is adapted to be pushed forwardly, as indicated by the dotted line position thereof in FIG. 28, and laterally beyond the edge 652 of the plate 604 and in front of the carriage mechanism nose piece 369 and the switch arm 207 (FIGS. 18 and 18A).

The actuation of the rack stop 601 (FIG. 28) is caused by an energization of the corresponding solenoid S13, through its plunger 618 to the solenoid lever 639. Thus, by taking advantage of a slight but normal amount of play in the plunger 618 of the type solenoid NS13 used, the solenoid lever 639, disc C, and actuating lever 638 rotate counterclockwise (FIG. 28) as a unit to force the rack stop 601 outwardly or to the left as viewed. To return the rack stop, although the spring 648 helps, a return rod 652 (FIG. 34) is utilized. The return rod 652 extends longitudinally across the front edge of all the actuating levers 642, 638, 632 and 623 (FIGS. 27 and 28) and is tied at its ends to the inner ends 653 of a pair of bars 654 (FIG. 34).

The outer ends of the bars 654, extended through slots provided therefor in the front plate 606, are pivotally connected to the lower ends of a pair of links 656 secured to the outer ends 657 of an actuator shaft 658, rotatably mounted adjacent the ends thereof in a pair of brackets 659 (FIGS. 4 and 28). The center of the shaft 658 is securely held by a clamp 661 (FIG. 34) pivotally connected at its inner end to a link 662 in turn connected to the plunger 663 of a stop retractor solenoid RS mounted on the front plate 606. Adjacent the solenoid RS, a stop retractor solenoid switch RSS (FIGS. 2 and 4) is mounted for operation by a Micarta bracket 664 secured to one of the bars 654.

Upon energization of the solenoid RS, its linkage is pivoted whereby to pull the return rod 652 from its full line position (FIGS. 28) forwardly to its dotted line position, and in turn bringing with it any of the actuating levers, such as 638, from their actuated positions as shown by dotted lines, to their non-actuated positions indicated by full lines. The solenoid RS is only momentarily energized, being de-energized immediately at its full strength by RSS which acts to reset CCR and open CCR–C (FIG. 35); and to return its linkage and the return rod 652 to its normal position spaced rearwardly of the actuating lever, a pair of coil springs 666 (FIG. 34) are utilized, one end of each spring being inserted in a bracket 659 and the other end inserted in the shaft 658. As the solenoid plunger 663 is forced upwardly by the action of the coil springs 666, its extended position is properly limited by a limit screw 667 (FIG. 28) inserted through a bracket 668 mounted on the top plate 604.

Althouh in the particular embodiment described herein, only one solenoid NS is energized at a time, it is entirely conceivable that more than one solenoid NS can be simultaneously energized, whereby for analogous applications of the carriage step mechanism 59, permutable combination of solenoids NS can simultaneously impart functional movements to their respective levers and rack stops 601.

Operation

For purposes of clarity, the operation of the notcher 40 is divided into two sections, one with respect to the plate feeding sequence for each plate 41, and the other with respect to the notching operation of each plate. The following Electrical Nomenclature index is provided as an easy reference for the location and function of the various electrical components.

Plate Feeding Sequence

The Plate Feeding Sequence consists of the following four basic operations:

(1) Unclamp and deliver notched plate 41.
(2) Return notching carriage 68 to latched position.
(3) Load embossed plate on notching carriage 68 and clamp.
(4) Release notching carriage 68 for notching pass, return to normal.

The sequence begins with the notching carriage 68 in normal position; i.e., at the delivery position (adjacent to the plate delivery chute 47) and with a notched plate 41 still clamped in the carriage. Each of the four basic operations is described in detail below.

(1) *Unclamp and deliver.* The plate *discharge code* is the last code sensed by the tape reader mechanism 49 for each plate 41. The notching carriage 68 is at normal position when the plate discharge code is sensed. The plate discharge code, when sensed by the tape reader mechanism 49, produces a momentary closure of PDRS, thus energizing AS and PDS. AS is energized at this point since the notching carriage 68 is in normal position and is holding CLS2 closed, CLR2 is energized and CLR2–A is closed. PDS is energized by PDRS at this point since CLS2 is closed. Observe here that PDRS is rendered completely ineffective at any time the notching carriage 68 is out of normal position, as illustrated in FIGS. 9–10A.

AS, when energized, causes the notching carriage 68, by operation of the actuating mechanism 69, to unclamp the notched plate 41. AS trips the single revolution clutch 426 (FIG. 22) in the actuator mechanism 69; the actuator mechanism left linkage 451 pushes the notching carriage drawbar 357 to force the plate stage 312 down, thus unclamping the notched plate. Since AS is only energized momentarily (by PDRS), the single revolution clutch 426 is automatically stopped at the end of one revolution, and the actuator mechanism returns to its normal state, leaving the notched plate free to be extracted from the notching carriage 68 and dropped through the delivery chute 47 to the stacking tray 48. The actuator mechanism places the notched plate in fully unclamped position in about ¼ second.

PDS is energized at the same time as AS. PDS trips the embossing carriage release clutch (not shown) which causes immediate and complete release of the embossing carriage 45, (FIG 10) i.e., the carriage retracts fully from the embossing head and moves all the way to the right to its limit (FIG. 10), at which point it is in the position where the embossed plate 41 it carries may be extracted. The embossing carriage release clutch (single revolution) causes the plate discharge lever clutch (not shown—also single revolution) to start, but with a 270 degree or about one second delay. This delay provides ample time for the complete release of the embossing carriage 45 and for the unclamping operation at the notching carriage 68 prior to operation of the plate discharge lever 64.

The plate discharge lever clutch moves the plate discharge lever 64 from right (normal) to left; the lever actuates three pawls, each of which can engage a plate to transfer it to the next rest position:

(1) *Embossing carriage extractor 231 (FIG. 10).—*

This pawl engages the embossed plate in the post-embossing stage 41A and moves it to the intermediate position on the first cycle of the plate discharge lever 64.

(2) *Notching carriage loader 241 (FIG 10)*.—This pawl engages the embossed plate at the intermediate position 41B and loads it in the notching carriage 68 on the second cycle of the plate discharge lever 64.

(3) *Notching carriage extractor 259 (FIG. 10A)*.— This pawl engages the notched plate in the notching carriage stage 41C and moves it to the plate delivery chute 47 on the first cycle of the plate discharge lever 64.

The plate discharge lever 64, on its first cycle, moves from right to left causing the extractor pawls 231 and 259 to engage the plate 41A in the embossing carriage and the plate 41C in the notching carriage. As the lever 64 completes its first cycle, moving from left to right, the pawls transfer the plates as described in (1) and (3) above; in this latter motion, the plate discharge lever 64 causes a momentary closure of PDLS, energizing PDLR which pulls up and locks electrically on its own contact PDLR–A and closes PDLR–B. PDLS is effective in energizing PDLR at this point since the notching carriage 68 is still at its normal position, CLS1 is open, CLR1 is un-energized and CLR1–F and CLR1–G are closed. PDLS is prevented from tripping the tape reader mechanism 49 clutch on this first cycle of the plate discharge lever 64 since CLR1–A is open at this point. When the plate discharge lever completes its first cycle from left to right, it causes PDLL to close. Since PDLR is set (electrically held on PDLR–A) and PDLR–B is closed, PDLL on closing energizes PDLT and NCRP which are electrically in parallel.

(2) *Return notching carriage*.—PDLT, when energized, trips the plate discharge lever clutch (not shown) to start the lever through its second cycle; NCRP is energized at the same time, however, NCRP causes the notching carriage return pawl 204 to engage the notching carriage nose piece 369 and arm 207 (FIG. 9A); thus, as the plate discharge lever 64 starts its second cycle and moves from right to left, the notching carriage 68 is moved with it to its latched position where it will be ready to accept a plate 41A (FIG. 10), since it is still in the unclamped attitude. As the notching carriage moves into its latched position, CLS1 closes, energizing CLR1; observe that CLR1–F, on opening, resets PDLR and CLR1–G, on opening, isolates PDLR from PDLS.

(3) *Load and clamp*.—The plate discharge lever 64 here proceeds into its final stroke (left to right); in this stroke, the lever motion causes the notching carriage loading pawl 241 (FIG. 10) to move the embossed plate from the intermediate position 41B to its proper location 41C in the notching carriage 68. The lever 64 also causes the second momentary closure of PDLS which pulses the tape reader clutch magnet (not shown) through CLR1–A and trips the tape reader clutch. The plate discharge lever 64 proceeds to its normal position where its clutch mechanically trips out and leaves it at rest. Note that PDLL is closed at this point, but this fact presents no problem since PDLR has been reset and PDLR–B is open.

The tape reader clutch (single revolution), having been tripped as mentioned above, permits the tape reader mechanism 49 to advance the tape and read the next code up which is, as planned, the carriage return code. Recall here that the embossing carriage 45 is, at this point, in its fully released position and that the notching carriage 68 is in the unclamped attitude and in its latched position with a plate 41C to be notched already loaded. The sensing of the carriage return code by the tape reader results in a momentary closure of CRRS energizing AS, CRS, and CRR. AS is energized by CRRS since the notching carriage is in its latched position holding CLS1 closed and CLR1–B is closed. CRS and CRR, which are in parallel, are energized directly by the CRRS closure. Energizing AS here trips the single revolution clutch 426 (FIG. 22) in the actuator mechanism 69, this time to cause the mechanism to pull the notching carriage drawbar 357, raising and locking the plate stage 312 to clamp and lock the plate 41C for the notching operation. The actuator mechanism clamps and locks the plate in about ¼ second. CRS, when energized, trips the (embossing) carriage return clutch, and this clutch cycles the embossing carriage return lever 45A (FIG. 2) once, causing the lever to retract the embossing carriage 45 to its full lefthand position. Other mechanisms line-space the carriage 45 forward to the position where a new blank plate may be loaded into it and trip the plate feed clutch to load the new plate. This latter operation results in a momentary closure of a line feed tape feed switch (not shown) which trips the tape reader clutch, causing the tape reader to advance and read the next code up which is the first character on the plate; the embossing operation proceeds from this point in its normal manner.

(4) *Release notching carriage*.—At the point in the above operation where the notching carriage plate stage 312 is raised and locked by the actuator mechanism 69, the vertical motion of the plate stage causes PCS to close, energizing LRR (through CLR1–C and CLR1–E, since the carriage 68 is in its latched position with CLS1 closed and CLR1 energized). LRR pulls in closing LRR–A and thus energizing LRS; LRS pulls the notching carriage latch pawl 133 (FIG. 16), releasing the notching carriage 68 for the notching pass. LRR is de-energized immediately that the notching carriage leaves the latched position since CLS1 opens, de-energizing CLR1, and opening CLR1–C and CLR1–E; PCS opens also as the notching carriage 68 moves away from the latched position.

If it is assumed here that no notches 52 are to be cut in the plate 41C now locked up in the notching carriage 68 the carriage, when released from its latch pawl 133, by LRS will travel in one continuous motion to its normal position (all the way to the right) adjacent to the plate delivery chute 47, where it comes to rest with the plate 41C still clamped and locked.

The embossing operation normally takes much more time than the notching operation. Hence, the notching carriage 68 is in its normal position while the head of the embossing mechanism 46 finishes its job on the next plate up. When the embossing operation is complete, the last tape code read for the plate being embossed is the plate discharge code; when this code is read, one plate feeding sequence has been completed and another is begun. The notching operation is, in fact, the computer read-out function and is discussed in the following section.

*Notching Operation*

The notching operation consists of three closely associated functions. These are:

(1) Transfer of notching information from the computer UNAC to the notcher mechanism 40.

(2) Positioning of the notching carriage 68 for the accurate cutting of each notch 52.

(3) Control of the cutter mechanism 71 to cut each notch.

The source of information for the notching mechanism is the notch code register of the UNAC computer. Since the notcher mechanism 40 is designed to operate simultaneously with the embossing mechanism 46, two register assemblies of twenty-four relays each are required; one must supply the information (read-out) for the plate being notched while, at the same time, the other register must be storing notching information for the plate being embossed. The register assemblies control the notching carriage 68 through the notcher control switch, the notching relays and certain functional control relays, all a part of UNAC. The final read-out function of actually positioning the carriage is performed by the notching carriage stop mechanism 59 which also initiates the cutting cycle for each notch.

The notching operation may be considered to begin at the point in the plate feeding sequence where the plate discharge lever 64 is completing its second cycle and is moving from left to right, loading an embossed plate 41B (FIG. 10) into the notching carriage 68. It is assumed, of course, that the notching information just computed (during the embossing operation) for the plate being loaded is stored in the twenty-four relay notching register assembly still connected to the computing elements and not yet connected for read-out.

The plate discharge lever 64 (moving left to right and loading the plate to be notched) produces a momentary closure of PDLS and, through CLR1–A, pulses the tape reader clutch magnet which in turn trips the tape reader clutch for one revolution. Thus, the tape is advanced one line and senses the carriage return code. (See plate feeding sequence—3. Load and clamp.) The return code causes a momentary closure of CRRS energizing AS, CRS and CRR; CRR is thus pulsed producing a momentary closure at its contact CRR–A. CRR–A, in turn, pulses SR (a two-position relay with mechanically latched contacts) and causes it to reverse its condition (contact which was open is now closed and vice-versa). Operation of SR causes switching functions to occur (through S1 and S2, indicated but not shown in FIG. 35) which set up the notching register assembly (containing the information for the plate to be notched) for the read-out function during the notching pass. CRR–A is effective in pulsing SR at this point since the notching carriage 68 is in the latched position with CLS1 closed, CLR1 energized and CLR1–C closed; CLR1–C prevents operation of SR on all but the first carriage return code read for each embossing (and thus notching) cycle.

The above operation occurs immediately that CRRS closes (the only delays are in closing CRR–A and cycling the SR latching mechanism). Thus, only following the complete operation of SR, AS proceeds to trip the actuator clutch 426 clamping and locking the plate to be notched; recall here that as the actuator forces the plate stage 312 upward, PCS closes (FIG. 11), energizing LRR through CLR1–C and CLR1–E. At the instant PCS closes, it also energizes the NCS coil through the normally closed contact on LRR (LRR is deliberately adjusted for slow operation). Thus, through LRR–B, the NCS drive mechanism is cocked and as LRR operates, LRR–B opens, deenergizing the NCS coil and allowing the mechanism to step (moving the NCS wipers to point 1). It should be mentioned here that NCS is a twenty-six point stepping switch, so wired to the notch register assemblies that it will, once started, automatically run past any point at which a notch is not to be cut (as indicated by the register relay associated with each point) or stop at any point at which a notch is to be cut and remain there until the notch cutting cycle has been completed.

Assume now that the first notch is to be cut. PCS has closed, energizing NCS and LRR and as LRR operates, LRR–B opens, forcing NCS to step over to position 1 where it stops. As LRR–B opens, LRR–A closes, energizing LRS which pulls the notching carriage latch 133 (FIG. 16). At position 1, NCS energizes NR1 (see electrical index) which in turn energizes NS1 (FIG. 28). NS1 places a stop member 601 (FIG. 18A) in the path of the notching carriage rack. Now, as the notching carriage 68 moves away from its latched position under spring power, the notching carriage nose piece 369 (FIG. 18) moves with it. The carriage stop member 601 for the first notch is in its path, however, and the carriage comes to rest at this stop position and is held there under spring force of the reel 136. The carriage is now accurately positioned for the first notch to be cut.

The front end of the notching carriage nose piece 369 carries a lever 207 which causes CCS to be closed whenever the carriage 368 is held by a carriage stop member 601. On the next following closure of TS–1 sufficient to properly energize CCR, CCR operates and holds on its own contact CCR–A and closes CCR–B and CCR–C. TS–1 is a timed switch, closing for a fixed duration once for each revolution of its cam 454 (FIG. 19) mounted on the constant velocity shaft 422 in the actuator mechanism 69, which shaft rotates at about two revolutions per second. CCR–B, when closed, energizes CS; CS pulls the cutter latch 532 (FIG. 24) to release the cutter carriage, thus permitting the cutter carriage to feed the cutter 501 under control of the cutter carriage cam 458 (FIG. 21) to the full depth of the notch 52.

Just before the cutter 501 reaches the full depth of the notch, NCLS opens, de-energizing CSR, closing CSR–A. As the cutter retracts from full notching depth, under control of the cutter carriage cam 458, NCLS closes, energizing CSR and NCS (through CSR–A). CSR is adjusted for slow operation to assure that NCS is energized by CSR–A for a time duration sufficient to positively cock its drive mechanism. Thus, when CSR operates fully and CSR–A pulls open, NCS is de-energized and forced to step to position 2. It should be mentioned here that NCS will run by any position at which no notch is to be cut and will stop at any position at which a notch is to be cut and set the notching carriage stop at that position. Now that NCS has stepped away from position 1, NR1 and NS1 are de-energized but the spring force of the notching carriage nose piece 369 against the stop member 601 at position 1 prevents this stop member from retracting. When the cutter 501, in its motion from full notching depth to its latched rest position, is clear of the edge 53 of the plate 41, TS–2 closes. TS–2 is a timed switch, closing for a fixed duration once for each revolution of its cam 457 (FIG. 19). This cam is mounted on a constant velocity shaft 456 carrying the cutter carriage cam 458 also, which is directly driven by the actuator mechanism shaft 422 carrying the cam 454 which operates TS–1. When TS–2 closes, RS is energized (CCR–C is still closed at this point). The function of RS is to retract any stop member 601 which is extended into the path of the notching carriage nose piece 369 and to do this at the completion of each notch cutting cycle. In this case, RS retracts the carriage stop member 601 at notch position 1, permitting the notching carriage 368 to move under spring power to the next position at which a notch is to be cut. Full operation of RS causes RSS to open, resetting CCR and opening CCR–A, CCR–B and CCR–C. CCR–C (and TS–2) de-energize RS, allowing RSS to return to its normally closed position. CCR–B, on opening, releases the cutter latch 532 (FIG. 24) so that it will hold the cutter 501 in the latcher rest position when the cutter 501 is fully retracted. The cutter cycling circuits are in the ready state once more; NCS has stepped to the next position for which a notch is to be cut and has energized the notching relay (NR) and notching solenoid (NS) for that point placing the associated notching carriage stop in the path of the notching carriage rack. When the carriage nose piece 369 arrives at this stop, CCS is forced to close once more and a new cutter cycle begins.

When the cutting cycle for the last notch to be cut is completed, NCS runs automatically to its home point and the notching carriage 68 moves to its normal position, adjacent to the plate delivery chute 47, with the plate just notched still clamped and locked. When the notching carriage 68 arrives at this position, it closes CLS2 energizing CLR–2. CLR–2 and CLR2–C both open but only one is effective; it resets the twenty-four relay notch register from which notching information has just been read, but has no effect on the notch register which contains the notching information for the plate still in the embossing operation. This selectivity is under the control of SR, S1 and S2, all in UNAC or similar equipment.

Electrical Nomenclature
(CONTROL CIRCUIT SCHEMATIC—FIG. 35)

The items which appear in the list below are those which appear on the control circuit schematic (FIG. 35) or are closely associated with the control circuit functions. Each item is presented with information as to its illustration, location, and function, this itemization being in effect a summary of the electrical components described hereinbefore, plus reference to additional items necessary to the complete control circuit. The items are listed in the order in which they are mentioned in the preceding "operation" text. Where the abbreviation AM appears, this refers to an item which is an integral part of the Addressograph-Multigraph machine in which the notcher 40 is embodied.

| Item | Fig. No. | Description |
|---|---|---|
| PDRS | 1 | Plate Discharge Reader Switch (AM). Located in the group of seven reader switches indicated generally at GRS at the front end, lower left-hand corner of the tape reader mechanism 49; second switch from the right in this group. |
| AS | 23 | Actuator Solenoid. Located at the rear of the table top, directly under the notching carriage 68; trips the actuator mechanism clutch 426. |
| PDS | 1 | Plate Discharge Clutch Solenoid (AM). This is the center solenoid in a group of three indicated generally at PDS in Fig. 1, and mounted on the extreme left of the table top. |
| CLS2 | 10A | Notching Carriage Limit Switch. This switch is mounted on the guide bar 127 under the notching carriage 68; switch is adjacent to the plate delivery chute 47 and is operated by the notching carriage 307 directly. |
| CLR2 | | Notching Carriage Limit Relay. This relay is on a six-relay control circuit panel (not shown) mounted at the lower right side of the embossing machine 42. Energized by CLS2 (Fig. 10A). |
| PDLS | 2, 3 | Plate Discharge Lever Switch (AM). Mounted on the front edge of the table top and operated by a latch pawl 143 on the plate stacking linkage (Main bar 144). |
| PDLR | | Plate Discharge Lever Relay. On the control circuit panel; sets up second cycle of plate discharge lever 64. |
| CLS1 | 10A | Notching Carriage Limit Switch. This switch is mounted on opposite end of the notching carriage guide bar 127, from CLS2 and is operated directly by the notching carriage arm 306, but only when the carriage 68 is latched by LRS pawl 133 (Fig. 16). |
| CLR1 | | Notching Carriage Limit Relay. Actually consists of two relays of the control circuit panel. Energized by CLS1 (Fig. 10A). |
| PDLL | 2 | Plate Discharge Lever Limit Switch. Mounted on the back of the main stop mechanism support bracket 141, which is at the left of the stop mechanism 59; held closed by the plate discharge lever 64 when the lever is at rest (at full right hand position). |
| PDLT | 8, 8A | Plate Discharge Lever Trip Solenoid. Mounted on a bracket 147 directly under the plate loading magazine 44. |
| NCRP | 9A | Notching Carriage Return Pawl Solenoid. Located above the stop mechanism 59 at the right hand thereof. |
| CRRS | 1 | Carriage Return Reader Switch (AM). Located in the group of seven reader switches GRS at the front end, lower left-hand corner of the tape reader mechanism; fourth switch from the right in this group. |
| CRS | | Carriage Return Clutch Solenoid (AM). This is a solenoid (not shown) at the rear of the group of three solenoids mounted on the extreme left of the table top. |
| CRR | | Carriage Return Relay. This is a relay on the control circuit panel. Operates SR in UNAC (see below). |
| PCS | 11 | Plate Clamp Switch. Mounted at the front side of the short plate track 62 to the right of the embossing head 45; operated by the notching carriage plate stage 312 when the notching carriage 68 is in the latched position and the plate stage rises to clamp and lock the plate 41 to be notched. |
| LRR | | Latch Release Relay (not shown). Located in the functional control assembly of the computer UNAC. |
| LRS | 16 | Latch Release Solenoid. Mounted on the guide bar 127 under the notching carriage 68; operates latch pawl 133 to release the notching carriage for a notching pass. |
| SR | | Sequence Relay (not shown). Located in the functional control assembly of the computer (UNAC). |
| S1, S2 | | Sequence Switching Relays (not shown). Located in UNAC and operated directly by SR. |
| NCS | | Notcher Control Switch (NCSA). This is a multi-point stepping switch in UNAC which forms the Notcher Control Switch Assembly in the computer UNAC. |
| NR | | Notching Relays (NRA) (not shown). These are twenty-four relays in UNAC in two assemblies of twelve relays each. These relays are operated by NCS above, and, in turn, operate the notching solenoids NS. |
| NS | 28 | Notching Solenoids. These solenoids (24) are mounted in the carriage stop mechanism 59 and actuate the 24 carriage stops 601 in the head of the stop mechanism. (The notching relays and notching solenoids are not shown on the control circuit schematic.) |
| CCS | 9A | Cutter Cycle Switch. Mounted on the front end of the notching carriage nosepiece 369 and operated by the switch lever 207 at the same location; switch lever closes CCS whenever the nosepiece 369 is in contact with a carriage stop 601. |
| TS-1 | 6 | Cutter Cycle Timing Switch. This is a microswitch mounted at the extreme rear of the actuator mechanism 69 and actuated by a cam 454 (Fig. 19) on the actuator mechanism counter-shaft 422. |
| CCR | | Cutter Cycle Relay. Located at the lower right corner of the control circuit panel. |
| CS | 24 | Cutter Latch Solenoid. Located on the sideplate 506; pulls the latch pawl 532 on the cutter mechanism 71, to allow the cutter 501 to feed into the plate edge 53. |
| NCLS | 6 | Notch Complete Limit Switch. This switch is mounted on the actuator mechanism 69 under the cutter mechanism; operated by the spindle carriage 502, opening just before the cutter 601 reaches full notching depth. |
| CSR | | Notcher Control Switch Relay (not shown). Located in the functional control assembly of the computer; starts NCS to next point at the end of each notch-cutting cycle. Operated by NCLS. |
| TS-2 | 6 | Stop Retractor Timing Switch. Located at the actuator mechanism 69 adjacent to the plate stacking tray 48; operated by a cam 457 (Fig. 19) on the end of the ladder-chain driven cutter cam shaft 456. |
| RS | 4, 28 | Stop Retractor Solenoid. Mounted on the front of the carriage stop mechanism 59. |
| RSS | 2, 4 | Stop Retractor Solenoid Switch. Mounted immediately to the right of RS on the stop mechanism 59; operated by a Micarta bracket 664 on the right hand link actuated by RS. |
| PD | | Plate Discharge Relay (not shown). Located in the functional control assembly of the computer UNAC; operated by CLR1, energizes the computing circuits at the beginning of each computing cycle (not shown on control circuit schematic). |

As optional equipment for the apparatus 40, means for removing the chips cut from the plates 41 by the cutter 501 may be provided. The chip removal means may be embodied in the form of a housing 700 (FIG. 6) secured to the rear of the limit bar 78 (FIG. 10A) and encompassing the cutter 501. A vacuum hose 701 is attached at one end to the housing 700 for attachment at the other end (not shown) to any conventional vacuum equipment.

In summary, the invention is comprised of apparatus 40 for receiving a plate, mat, stencil or the like, which is subject to being notched or formed as by indentations or the like for subsequent sensing therefrom. The apparatus 40 is adapted to effect the formations on the plate by an electro-mechanical structure included therein, which is responsive to predetermined code or identification tabulations for momentarily halting a plate carrying carriage at selected ones of a plurality of positions, whereupon a device, electrically timed in sequential operation with the electro-mechanical structure, is operable to apply the formations directly to the plate.

I claim:

1. In an automatic record controlled embossing machine having a record reading means operable cyclically to read a predetermined portion of a record, and an embossing unit responsive to said record reading means for embossing in each cycle a plate with decimal information predetermined by said record reading means, apparatus for code deforming said plate subsequent to the embossment thereof and with the code deformation sensible by other devices to convey the same decimal information as that embossed, said apparatus comprising a control circuit, computer means in said control circuit and responsive to said record reading means for electrically summing and storing the decimal information for a subsequent read-out, a carriage reciprocally mounted for movement between a post-embossing position and a post-deforming position, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, and carriage stop means responsive in timed sequence to the read-out function of said computer means for momentarily halting the movement of said carriage at spaced pre-selected positions for engagement of said plate by said deforming means.

2. In an automatic record controlled embossing machine having a record reading means operable cyclically to read a predetermined portion of a record, and an embossing unit responsive to said record reading means for embossing in each cycle a plate with decimal information predetermined by said record reading means, apparatus for code deforming said plate subsequent to the embossment thereof and with the code deformation sensible by other devices to convey the same decimal information as that embossed, said apparatus comprising a control circuit, computer means in said control circuit and responsive to said record reading means for electrically summing and storing the decimal information for a subsequent read-out, plate guide means mounted on said machine for said plate, a carriage reciprocally mounted on said guide means for movement between a post-embossing position and a post-deforming position, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, and carriage stop means responsive in timed sequence to the read-out function of said computer means for momentarily halting the movement of said carriage at spaced pre-selected positions for engagement of said plate by said deforming means.

3. In an automatic record controlled embossing machine having a record reading means operable cyclically to read a predetermined portion of a record, and an embossing unit responsive to said record reading means for embossing in each cycle a plate with decimal information predetermined by said record reading means, apparatus for code deforming said plate subsequent to the embossment thereof and with the code deformation sensible by other devices to convey the same decimal information as that embossed, said apparatus comprising a control circuit, computer means in said control circuit and responsive to said record reading means for electrically summing and storing the decimal information for a subsequent read-out, a plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, means for deforming said plate movable into and out of a deforming position intermediate said post positions, said deforming means movable transversely to the direction of movement of said carriage, plate feeding means for selectively moving an embossed plate into said carriage from said post-embossing position and out of said carriage to said post-deforming position, actuator means operable in timed sequence to engage said carriage for effecting a clamping of said plate prior to said deforming thereof and to unclamp said plate subsequent to the deforming thereof, and carriage stop means responsive in timed sequence to the read-out function of said computer means for momentarily halting the movement of said carriage at spaced pre-selected positions for engagement of said plates by said deforming means.

4. In an automatic record controlled embossing machine having a record reading means operable cyclically to read a predetermined portion of a record, and an embossing unit responsive to said record reading means for embossing in each cycle a plate with decimal information predetermined by said record reading means, apparatus for code deforming said plate subsequent to the embossment thereof and with the code deformation sensible by other devices to convey the same decimal information as that embossed, said apparatus comprising a control circuit, computer means in said control circuit and responsive to said record reading means for electrically summing and storing the decimal information for a subsequent read-out, a plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, actuator means operable in timed sequence to engage said carriage for effecting a clamping of said plate prior to the deforming thereof, and for effecting an unclamping of said plate subsequent to the deforming thereof, and carriage stop means responsive to the read-out function of said computer means and including a plurality of stop members disposed in longitudinally spaced locations relative to said guide means, each of said stop members selectively adapted to be momentarily moved transversely into the path of said carriage for stopping said carriage, whereupon said deforming means is operable to be moved into said deforming position for engagement with said plate.

5. In an automatic record controlled embossing machine having a record reading means operable cyclically to read a predetermined portion of a record, and an embossing unit responsive to said record reading means for embossing in each cycle a plate with decimal information predetermined by said record reading means, apparatus for code deforming said plate subsequent to the embossment thereof and with the code deformation sensible by other devices to convey the same decimal information as that embossed, said apparatus comprising a control circuit, computer means in said control circuit and responsive to said record reading means for electrically summing and storing the decimal information for a subsequent read-out, a plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, spring means urging said carriage in a deformation spacing direction from said post-embossing position to said post-deforming position, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, actuator means operable in timed sequence to engage said carriage for effecting a clamping of said plate prior to the deforming thereof and to unclamp said plate subsequent to the deforming thereof, carriage stop means responsive to the read-out function of said computer means and including a plurality of stop members disposed in longitudinally spaced locations relative to said guide means, each of said stop members selectively adapted to be momentarily moved transversely into the path of said carriage for stopping said carriage, whereupon said deforming means is operable to be moved into said deforming position for engagement with said plate, and carriage return means associated with said plate feeding means for returning said carriage from said post-deforming position to said post-embossing position.

6. In an embossing machine having an embossing unit for embossing decimal information on each of a plurality of plates, a plate-carrying embossing carriage mounted for reciprocation past said embossing position, and information transmitting means for selectively controlling the embossing operation of said embossing unit, apparatus for code deforming each one of said plates subsequent to the embossment thereof, and with the coded deformation sensible to convey the same decimal information as that embossed, said apparatus comprising a control circuit, computer means in said control circuit responsive to said information transmitting means for electrically summing and storing the decimal information for subsequent read-out as controlled by said control circuit, a carriage reciprocally mounted for movement between a post-embossing position and a post-deforming position, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, and carriage stop means responsive in timed sequence to the read-out function of said computer means for momentarily halting the movement of said carriage at spaced pre-selected positions for engagement of said plate by said deforming means.

7. In an embossing machine having an embossing unit for embossing decimal information on each of a plurality of plates, a plate-carrying embossing carriage mounted for reciprocation past said embossing position, and information transmitting means for selectively controlling the embossing operation of said embossing unit, apparatus for code deforming each one of said plates subsequent to the embossment thereof, and with the coded deformation sensible to convey the same decimal information as that embossed, said apparatus comprising a control circuit, computer means in said control circuit responsive to said information transmitting means for electrically summing and storing the decimal information for subsequent read-out as controlled by said control circuit, plate guide means mounted on said machine between the embossing unit and a discharge means of said machine for said plate, a carriage reciprocally mounted on said guide means for movement between a post-embossing position and a post-deforming position, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, and carriage stop means responsive in timed sequence to the read-out function of said computer means for momentarily halting the movement of said carriage at spaced pre-selected positions for engagement of said plate by said deforming means.

8. In an embossing machine having an embossing unit for embossing decimal information on each of a plurality of plates, a plate-carrying embossing carriage mounted for reciprocation past said embossing position, and information transmitting means for selectively controlling the embossing operation of said embossing unit, apparatus for code deforming each one of said plates subsequent to the embossment thereof, and with the coded deformation sensible to convey the same decimal information as that embossed, said apparatus comprising a control circuit, computer means in said control circuit responsive to said information transmitting means for electrically summing and storing the decimal information for subsequent read-out as controlled by said control circuit, plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, actuator means operable in timed sequence to engage said carriage for effecting a clamping of said plate prior to said deforming thereof and to unclamp said plate subsequent to the deforming thereof, and carriage stop means responsive in timed sequence to the read-out function of said computer means for momentarily halting the movement of said carriage at spaced pre-selected positions for engagement of said plate by said deforming means.

9. In an embossing machine having an embossing unit for embossing decimal information on each of a plurality of plates, a plate-carrying embossing carriage mounted for reciprocation past said embossing position, and information transmitting means for selectively controlling the embossing operation of said embossing unit, apparatus for code deforming each one of said plates subsequent to the embossment thereof, and with the coded deformation sensible to convey the same decimal information as that embossed, said apparatus comprising a control circuit, computer means in said control circuit responsive to said information transmitting means for electrically summing and storing the decimal information for subsequent read-out as controlled by said control circuit, plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, means for deforming said plate movable into and out of a deforming position intermediate said post positions, said deforming means movable transversely to the direction of movement of said carriage, plate feeding means for selectively moving an embossed plate into said carriage from said post-embossing position, and out of said carriage to said post-deforming position, actuator means operable in timed sequence to engage said carriage for effecting a clamping of said plate prior to the deforming thereof, and for effecting an unclamping of said plate subsequent to the deforming thereof, and carriage stop means responsive to the read-out function of said computer means and including a plurality of stop members disposed in longitudinally spaced locations relative to said guide means, each of said stop members selectively adapted to be momentarily moved transversely into the path of said carriage for stopping said carriage, whereupon said deforming means is operable to be moved into said deforming position for engagement with said plate.

10. In an embossing machine having an embossing unit for embossing decimal information on each of a plurality of plates, a plate-carrying embossing carriage mounted for reciprocation past said embossing position, and information transmitting means for selectively controlling the embossing operation of said embossing unit, apparatus for code deforming each one of said plates subsequent to the embossment thereof, and with the coded deformation sensible to convey the same decimal information as that embossed, said apparatus comprising a control circuit, computer means in said control circuit responsive to said information transmitting means for electrically summing and storing the decimal information for subsequent read-out as controlled by said control circuit, plate guide means mounted on said machine between the embossing unit and a discharge means of said machine for said plate, a carriage reciprocally mounted on said guide means for movement between a post-embossing position and a post-deforming position, said carriage adapted to clamp and unclamp said plate, spring means urging said carriage in a deformation spacing direction from said post-embossing position to said post-deforming position, means for deforming said plate movable into and out of a deforming position intermediate said post positions, said deforming means movable transversely to the direction of movement of said carriage, plate feeding means for sequentially moving an embossed plate into said carriage from said post-embossing position, and out of said carriage to said post-deforming position, actuator means operable in timed sequence to engage said carriage for effecting a clamping of said plate prior to the deforming thereof, and to engage said carriage for effecting an unclamping of said plate subsequent to the deforming thereof, carriage stop means responsive to the read-out function of said computer means and including a plurality of stop members disposed in longitudinally spaced locations relative to said guide means, each of said stop members selectively adapted to be momentarily moved transversely into the path of said carriage for stopping said carriage, whereupon said deforming means is operable to be moved into said deforming position for engagement with said plate, and carriage return means associated with said plate feeding means for returning said carriage from said post-deforming position to said post-embossing position.

11. In an embossing machine having an embossing unit for embossing information on each of a plurality of plates, a plate-carrying embossing carriage mounted for reciprocation past said embossing position, and information transmitting means the operation of which selectively controls the embossing operation of said embossing unit; apparatus for applying such information in the form of notches or the like to each one of said plates subsequent to the embossment thereof, and with the applied information sensible to convey the same information, said apparatus comprising a control circuit, means in said control circuit for storing said information, a plate-carrying notching carriage mounted for reciprocation in notch spacing and carriage return directions between a plate loading position and a plate unloading position, signal responsive means for selectively cutting a notch in said carried plate movable tarnsversely to said reciprocation directions into and out of a plate cutting position intermediate said plate loading and unloading positions, plate feeding means operable in response to signals from said control circuit for removing a plate from said embossing carriage, moving said plate into said notching carriage, and extracting said plate from said notching carriage subsequent to the notching of said plate, and information selector means responsive to a read-out function of said storing means and adapted to momentarily halt said notching carriage at one or more pre-selected positions in front of said cutting means, said control circuit adapted upon each halting of said notching carriage to signal said cutting means to make a notching pass at said plate.

12. In an embossing machine having an embossing unit for embossing information on each of a plurality of plates, a plate-carrying embossing carriage mounted for reciprocation past said embossing position and information transmitting means the operation of which selectively controls the embossing operation of said embossing unit; apparatus for applying such information in the form of notches or the like to each one of said plates subsequent to the embossment thereof, and with the applied information sensible to convey the same information, said apparatus comprising a control circuit, means in said control circuit for storing said information, a plate-carrying notching carriage mounted for reciprocation in notch spacing and carriage return directions between a plate loading position and a plate unloading position, said notching carriage adapted to clamp and unclamp said plate, signal responsive means for selectively cutting a notch in said carried plate movable transversely to said directions into and out of a plate cutting position intermediate said plate loading and unloading positions, plate feeding means operable in response to signals from said control circuit for moving a plate from said embossing carriage into said notching carriage, and out of said notching carriage subsequent to the notching of said plate, information selector means responsive to a read-out function of said storing means and adapted to momentarily halt said notching carriage at one or more pre-selected positions in front of said cutting means, said control circuit adapted upon each halting of said notching carriage to signal said cutting means to make a notching pass at said plate, and actuator means operable in timed sequence to engage said notching carriage for effecting a clamping of said plate prior to said notching pass, and to effect an unclamping of said plate subsequent to said notching pass.

13. In an embossing machine having an embossing unit for embossing information on each of a plurality of plates, a plate-carrying embossing carriage mounted for reciprocation past said embossing position and information transmitting means the operation of which selectively controls the embossing operation of said embossing unit; apparatus for applying such information in the form of notches or the like to each one of said plates subsequent to the embossment thereof, and with the applied information sensible to convey the same information, said apparatus comprising a control circuit, means in said control circuit for storing said information, a plate-carrying notching carriage mounted for reciprocation in notch spacing and carriage return directions between a plate loading position and a plate unloading position, spring means urging said notching carriage in a deformation spacing direction from said plate loading position to said plate unloading position, a signal responsive means for selectively cutting a notch in said carried plate movable transversely to said directions into and out of a plate cutting position intermediate said plate loading and unloading positions, plate feeding means operable in response to signals from said control circuit for moving a plate from said embossing carriage into said notching carriage, and out of said notching carriage subsequent to the notching of said plate, information selector means responsive to a read-out function of said storing means and adapted to momentarily halt said notching carriage at one or more pre-selected positions in front of said cutting means, said control circuit adapted upon each halting of said plate-carrying carriage to signal said cutting means to make a notching pass at said plate, and carriage return means associated with said plate feeding means for returning said notching carriage from said plate unloading position to said plate loading position.

14. In an embossing machine having an embossing unit for embossing information on each of a plurality of plates, a plate-carrying embossing carriage mounted for reciprocation past said embossing position, and information transmitting means the operation of which selectively controls the embossing operation of said embossing unit; apparatus for applying such information in the form of notches or the like to each one of said plates subsequent to the embossment thereof, and with the applied information sensible to convey the same information as that embossed, said apparatus comprising a control circuit operable in response to said information transmitting means to control said apparatus, a plate-carrying notching carriage mounted for reciprocation in notch spacing and carriage return directions between a plate loading position and a plate unloading position, means for selectively cutting a notch in said carried plate movable transversely to said directions into and out of a plate cutting position intermediate said plate loading and unloading positions, plate feeding means operable in response to signals from said control circuit for moving a plate from said embossing carriage into said notching carriage, and out of said notching carriage subsequent to the notching of said plate, and information selector means rseponsive to said control circuit adapted to momentarily halt said notching carriage at one or more pre-selected positions in front of said cutting means, said control circuit adapted upon each halting of said notching carriage to signal said cutting means to make a notching pass at said plate.

15. In an embossing machine having an embossing unit for embossing information on each of a plurality of plates, a plate-carrying embossing carriage mounted for reciprocation past said embossing position, and information transmitting means the operation of which selectively controls the embossing operation of said embossing unit, apparatus for applying such information in the form of notches or the like to each one of said plates subsequent to the embossment thereof, and with the applied information sensible to convey the same information as that embossed, said apparatus comprising a control circuit operable in response to said information transmitting means, plate guide means mounted on said machine between the embossing unit and a discharge means of said machine for said plate, a plate-carrying notching carriage reciprocally mounted on said guide means for movement in notch spacing and carriage return directions between a plate loading position and a plate unloading position, signal responsive means for selectively cutting a notch in said carried plate movable transversely to said directions into and out of a plate cutting position intermediate said plate loading and unloading positions, plate feeding means operable in response to signals from said control circuit for moving a plate from said embossing carriage into said notching carriage, and out of said notching carriage subsequent to the notching of said plate, information selector means responsive to said control circuit and including a plurality of stop members disposed in longitudinally spaced locations relative to said guide means, each of said stop members selectively adapted to be momentarily moved into the path of said notching carriage for stopping said notching carriage, whereupon said cutting means is operable to be moved into said plate cutting position for engagement with said plate, spring means for urging said notching carriage from said plate loading position to said plate unloading position, and carriage return means associated with said plate feeding means for returning said notching carriage from said plate unloading position to said plate loading position.

16. In a machine for embossing metallic plates or the like, an automatic plate notching apparatus responsive to stored signals comprising an elongated guidetrack extended between a plate loading position and a plate unloading position, a mechanism for applying information to each plate in the form of a notch or the like, a carriage reciprocally mounted on said guidetrack for movement past said mechanism, plate feeding means for selectively feeding a plate into said carriage prior to passing said mechanism, and for withdrawing said plate from said carriage after passing said mechanism, and a carriage stop mechanism operable in response to said signals when read out to momentarily halt the movement of said carriage at selected one or ones of a plurality of spaced positions in front of said mechanism, said mechanism adapted in signal response to each halting of said carriage to make a notching pass at said plate.

17. In an embossing machine for metallic plates or the like, an automatic plate notching apparatus comprising a control circuit responsive to stored signals, an elongated guidetrack extended between a plate post-embossing position and a plate discharge position, a plate-carrying notching carriage spring movable on said guidetrack between said positions, said carriage including a resilient clamp unit and a movable stage means for clamping said plate against said clamp unit, actuator means operatively associated with said movable stage means for effecting a clamping of said plate prior to movement of said carriage from said plate post-embossing position, and for effecting an unclamping of said plate when said carriage is in said plate discharge position, signal responsive means for making a notching pass to cut a notch or the like in said clamped plate movable transversely to said guidetrack intermediate said positions, and means for momentarily stopping said carriage in response to signals from said control circuit at pre-selected one or ones of longitudinally spaced positions of said plate in front of said cutting means, whereby upon each stopping of said carriage such cutting means is signaled to effect a notching pass.

18. In a machine for embossing metallic plates or the like, an automatic plate notching apparatus comprising a control circuit responsive to stored signals, an elongated guidetrack extended between a plate loading position and a plate unloading position, a plate-carrying notching carriage spring movable on said guidetrack from said plate loading position to said plate unloading position, said carriage including a resilient clamp unit and a movable stage means for clamping said plate against said clamp unit, actuator means including a pair of selectively operable toggle linkage units operatively associated with said stage means and spaced longitudinally along said guidetrack, one of said toggle units adapted upon actuation to clamp said stage means aganist said clamp unit, and the other of said toggle units adapted upon actuation to unclamp said stage means from said clamp unit, signal responsive means for making a notching pass to cut a notch or the like in said clamped plate movable transversely to said guidetrack intermediate said plate loading and plate unloading positions, and means for momentarily stopping said carriage in response to signals from said control circuit at pre-selected longitudinally spaced positions of said plate in front of said cutting means, whereby upon each stopping of said carriage such cutting means is signaled to effect a notching pass.

19. In a machine for embossing metallic plates or the like, an automatic plate notching apparatus comprising a control circuit responsive to stored signals, an elongated guidetrack extended between a plate loading position and a plate unloading position, a plate-carrying notching carriage spring movable on said guidetrack from said plate loading position to said plate unloading position and including a resilient clamp unit and a movable stage means for clamping said plate against said clamp unit, actuator means including a pair of selectively operable toggle linkage units operatively associated with said stage means and spaced longitudinally along said guidetrack, one of said toggle units adapted upon actuation to clamp said stage means against said clamp unit, and the other of said toggle units adapted upon actuation to unclamp said stage means from said clamp unit, said actuator means including a constantly rotating, eccentrically mounted cam means, signal responsive means for making a notching pass to cut a notch or the like in said clamped plate movable transversely to said guidetrack intermediate said plate loading and unloading positions, said signal responsive means oscillatable by engagement with said cam means, and including means signal operable in timed sequence with said oscillation of said cutting means for permitting said signal responsive means an oscillatory movement sufficient to make a notching pass at said clamped plate, and means for momentarily stopping said carriage in response to signals from said control circuit at pre-selected longitudinally spaced positions of said plate in front of said signal responsive means, said signal responsive means being signaled to effect a notching pass upon each stopping of said carriage.

20. In a machine for embossing metallic plates or the like, an automatic plate notching apparatus comprising a control circuit responsive to stored signals, an elongated guidetrack extended between a plate loading position and a plate unloading position, a plate-carrying notching carriage reciprocally movable on said guidetrack between a plate loading and plate unloading position including a resilient clamp unit having stationary guide means depending therefrom, transversely adjustable guide means opposite said stationary guide means and depending from said clamp unit, and a movable stage means for clamping said plate against said clamp unit and between said guide means, actuator means including a pair of selectively operable toggle linkage units operatively associated with said stage means and spaced longitudinally along said guidetrack, said toggle linkage units adapted upon actuation to sequentially clamp and unclamp said plate by action of said stage means relative to said clamp unit, said actuator means including a constantly rotated, eccentrically mounted cam, signal responsive cutting means for making a notching pass to cut a notch or the like in said clamped plate movable transversely to said guidetrack intermediate said plate loading and unloading positions, said cutting means oscillatable by engagement with said cam and including a means signal operable in timed sequence with said oscillation of said cutting means for permitting said cutting means an oscillatory movement sufficient to make a notching pass at said clamped plate, and means for momentarily stopping said carriage in response to signals from said control circuit at pre-selected one or ones of longitudinally spaced positions of said plate in front of said cutting means, said cutting means being signaled to effect a notching pass upon each stopping of said carriage.

21. In an automatic mechanism responsive to external signals, a set of code bars in parallel alignment, a plurality of selectable levers in parallel alignment each of which is engageable with a corresponding code bar, an elongated shaft extended transversely to said bars and to said levers, a plurality of circular members rotatably mounted in a side-by-side relation on said shaft and each of which is operatively connected to a corresponding lever, whereby selective rotation of a circular member imparts arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of a signal responsive means imparts a rotative movement to a selected circular member and thus to a selected lever.

22. In an automatic mechanism responsive to external signals, a set of code bars in parallel alignment, means for guidably mounting and maintaining said code bars in said parallel alignment, a plurality of selectable levers in parallel alignment each of which is engageable with a corresponding code bar, an elongated frame member extended transversely to said levers and having an axially extended bore formed therein, an elongated shaft extended along the longitudinal axis of said frame member within said bore, a plurality of circular members rotatably mounted in said bore in a side-by-side relation on said shaft and each of which is operatively connected to a corresponding lever, whereby selective rotation of a circular member imparts an arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means each operatively connected to a corresponding circular member, whereby actuation of a signal responsive means imparts a rotative movement to a selected circular member and thus to a selected lever.

23. In an automatic mechanism responsive to external signals, a set of code bars in parallel alignment, means for guidably mounting and maintaining said code bars in said parallel alignment, a plurality of selectable levers in parallel alignment each of which is engageable with a corresponding code bar, an elongated frame member extended transversely to said levers and having an axially extended bore formed therein, an elongated shaft extended along the longitudinal axis of said frame member within said bore, a plurality of circular members rotatably mounted in said bore in a side-by-side relation on said shaft and each of which is operatively connected to a corresponding lever, whereby selective rotation of a circular member imparts an arcuate movement to a corresponding lever about said shaft, the movement of the corresponding lever imparting a function performing motion to a corresponding code bar, a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of a signal responsive means imparts a rotative movement to a selected circular member and thus to a selected lever, and means for resetting said selected code bar after said function performing motion thereof.

24. In an automatic mechanism responsive to external signals, a set of code bars in parallel alignment, a plurality of selectable levers in parallel alignment each of which is engageable with a corresponding code bar, an elongated shaft extended transversely to said bars and to said levers, a plurality of circular members rotatably mounted in a side-by-side relation on said shaft and each of which is operatively connected to a corresponding lever, whereby selective rotation of a circular member imparts arcuate movement to a corresponding lever about said shaft, the movement of the corresponding lever imparting a function performing motion to a corresponding code bar, a plurality of signal responsive means mounted in a longitudinally spaced manner relative to said shaft, a plurality of longitudinally offset rows of said signal responsive means each operatively connected to a corresponding circular member, whereby actuation of a signal responsive means imparts a rotative movement to a selected circular member and thus to a selected lever, and means for resetting said selected code bar after said function performing motion thereof.

25. In an automatic mechanism responsive to external signals, a set of code bars in parallel alignment, a plurality of selectable levers in parallel alignment each of which is engageable with a corresponding code bar, an elongated frame member extended transversely to said levers and having an axially extended bore formed therein, an elongated shaft extended along the longitudinal axis of said frame member within said bore, a plurality of circular members rotatably mounted in said bore in a side-by-side relation on said shaft and each of which is operatively connected to a corresponding lever, whereby selective rotation of a circular member imparts an arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of a signal responsive means imparts a rotative movement to a selected circular member and thus to a selected lever.

26. In an automatic mechanism responsive to external signals, a set of code bars in parallel alignment, a plurality of selectable levers in parallel alignment each of which is engageable with a corresponding code bar, an elongated frame member extended transversely to said levers and having an axially extended bore formed therein, an elongated shaft extended along the longitudinal axis of said frame member within said bore, a plurality of circular members rotatably mounted in said bore in a side-by-side relation on said shaft and each of which is operatively connected to a corresponding lever, whereby selective rotation of a circular member imparts an arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of a signal responsive means imparts a rotative movement to a selected circular member and thus to a selected lever, and means for resetting said selected code bar after said function performing motion thereof.

27. In an automatic mechanism responsive to external signals, a set of code bars in parallel alignment, means for guidably mounting and maintaining said code bars in said parallel alignment, a plurality of selectable levers in parallel alignment each of which is engageable with a corresponding code bar, an elongated frame member extended transversely to said levers and having an axially extended bore formed therein, said frame member having a plurality of elongated transversely extended arcuately spaced slots formed therein, an elongated shaft extended along the longitudinal axis of said frame member within said bore, a plurality of circular members rotatably mounted in said bore in a side-by-side relation on said shaft and each of which is operatively connected to a corresponding lever, whereby selective rotation of a circular member imparts an arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of a signal responsive means imparts a rotative movement to a selected circular member and thus to a selected lever, and means for resetting said selected code bar after said function performing motion thereof.

28. In an automatic mechanism responsive to external signals, a set of code bars in parallel alignment, means for guidably mounting and maintaining said code bars in said parallel alignment, a plurality of selectable levers in parallel alignment each of which is engageable with a corresponding code bar, an elongated frame member extended transversely to said levers and having an axially extended bore formed therein, said frame member having a plurality of elongated, transversely extended arcuately spaced slots formed therein, an elongated shaft extended along the longitudinal axis of said frame member within said bore, a plurality of circular members rotatably mounted in said bore in a side-by-side relation on said shaft and each of which is operatively connected to a corresponding lever, each circular member having one or more tangentially offset slots formed therein for fixedly receiving a respective lever, whereby selective rotation of a circular member imparts an arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected by arm means inserted through a respective frame member slot to a corresponding circular member, whereby actuation of a signal responsive means imparts a rotative movement to a selected circular member and thus to a selected lever, and means for resetting said selected code bar after said function performing motion thereof.

29. In an automatic mechanism responsive to external signals, a set of code bars in parallel alignment, a plurality of selectable levers in parallel alignment each of which is engageable with a corresponding code bar, an elongated shaft extended transversely to said bars and to said levers, a plurality of circular members rotatably mounted in a side-by-side relation to said shaft and each of which is operatively connected to the corresponding lever, whereby selective rotation of a circular member imparts arcuate movement to a corresponding lever about said shaft, the movement of the corresponding lever imparting a function performing motion to a corresponding code bar, and a plurality of signal responsive means mounted in a longitudinally spaced manner relative to said shaft, a plurality of longitudinally offset rows of said signal responsive means mounted radially about said shaft, each of said signal responsive means operatively connected to a corresponding circular member, whereby actuation of at least one signal responsive means imparts a rotative movement to a selected circular member and thus to a selected lever.

30. In a mechanism for holding a metallic plate or the like, first means automatically responsive to the longitudinal movement of a plate therein for longitudinally locating said plate and for clamping said plate against longitudinal movement, and second means spaced from said first means automatically adjustable, in response to movement of said first means thereagainst to clamp said plate, to transversely locate said plate and to clamp said plate against transverse movement.

References Cited in the file of this patent

UNITED STATES PATENTS

| | | |
|---|---|---|
| 2,022,498 | Glogaud et al. | Nov. 26, 1935 |
| 2,576,211 | Bone | Nov. 27, 1951 |
| 2,576,596 | Gollwitzer | Nov. 27, 1951 |